United States Patent [19]
Koller et al.

[11] 4,083,847
[45] Apr. 11, 1978

[54] TRANSIENTLY WATER-SOLUBLE DISPERSE MONO-AZO DYES CONTAINING A DIAMINO-METHYLENE-CARBACYL GROUP

[75] Inventors: Stefan Koller, Ramlinsburg; Peter Aeschlimann, Basel; Urs Karlen, Magden; Hans Wilhelm Liechti, Oberwil, all of Switzerland

[73] Assignee: Ciba-Geigy Corporation, Ardsley, N.Y.

[21] Appl. No.: 555,220

[22] Filed: Mar. 4, 1975

[30] Foreign Application Priority Data

Mar. 7, 1974 Switzerland .................. 3211/74

[51] Int. Cl.$^2$ .................. C09B 43/12; C09B 43/18; D06P 1/18; D06P 3/54
[52] U.S. Cl. .................. 260/207; 260/152; 260/154; 260/155; 260/156; 260/157; 260/158; 260/162; 260/163; 260/165; 260/174; 260/178; 260/196; 260/198; 260/199; 260/207.1; 260/283 S; 260/286 Q; 260/304 R; 260/370; 260/376; 260/377; 548/358
[58] Field of Search .................. 260/153, 154, 155, 156, 260/157, 158, 162, 163, 152, 174, 178, 205, 206, 207, 207.1

[56] References Cited

U.S. PATENT DOCUMENTS

| | | | |
|---|---|---|---|
| 2,219,280 | 10/1940 | Graenacher et al. | 260/156 |
| 2,821,526 | 1/1958 | Boyd | 260/205 |
| 3,117,960 | 1/1964 | Illy | 260/156 |
| 3,119,809 | 1/1964 | Nicolaus | 260/158 |
| 3,148,181 | 9/1964 | Wallace et al. | 260/207 |
| 3,532,683 | 10/1970 | Sartori | 260/207 |
| 3,542,758 | 11/1970 | Hegar | 260/156 |
| 3,631,164 | 12/1971 | Hegar | 260/156 |
| 3,694,426 | 9/1972 | Doss | 260/156 |
| 3,729,459 | 4/1973 | Hegar | 260/205 |
| 3,876,627 | 4/1975 | Kruckenberg | 260/205 |

FOREIGN PATENT DOCUMENTS 1,090,691  11/1967  United Kingdom .............. 260/156

Primary Examiner—Floyd D. Higel
Attorney, Agent, or Firm—Edward McC. Roberts; Michael W. Glynn; Prabodh I. Almaula

[57] ABSTRACT

Dyes of the formula

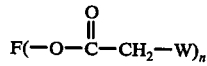

wherein F is a dye of the disperse class, $n$ is 1 or 2, and W is the radical of a diammonium or aminoammonium compound which is linked through an ammonium group to the methylenecarbonyloxy radical, said dyes finding utility in dyeing and printing hydrophobic synthetic organic materials, especially polyester materials in an aqueous dyebath at elevated temperatures, whereby the carbacyl group undergoes hydrolysis to form a disperse dye which exhausts onto the material.

9 Claims, No Drawings

TRANSIENTLY WATER-SOLUBLE DISPERSE MONO-AZO DYES CONTAINING A DIAMINO-METHYLENE-CARBACYL GROUP

The invention provides transiently water-soluble disperse dyes, a process for their manufacture and a method of using them for dyeing and printing hydrophobic synthetic organic material, especially polyester material.

It is generally known to dye hydrophobic synthetic organic material, especially polyester material, with disperse dyes as described, for example, in the Colour Index. These dyes are coloured, organic compounds which do not contain water-solubilising groups, such as sulphonic acid or ammonium groups, and which are only imperceptibly soluble in water and exhaust onto the material from a molecular disperse solution. To this end, the disperse dyes must be very finely ground before the actual dyeing procedure and stabilised in the aqueous dyebath by adding large amounts of dispersants. During the dyeing, the dye is not in solution but in dispersion. In actual practice this often gives rise to considerable difficulties, for these dyestuff dispersions are frequently unstable: the dye crystallises out and this in turn results in unlevel dyeings. Particularly in high temperature dyeing, insufficient stability of the dispersions becomes apparent through filtration phenomena in thick material, as on cheeses and in beam dyeing. In addition, the dispersants in large-scale dyeing machinery can lead to foaming and, since they are largely poisonous, result in severe effluent pollution. Problems also arise in the dyeing of blended fabrics, since water-soluble dyes are often poorly conpatible with the dispersants of the disperse dyes.

It is the object of the present invention to provide dyes which make it possible to avoid these difficulties by dyeing hydrophobic, synthetic organic material in a slightly acid, neutral or alkaline solution of transiently water-soluble disperse dyes that contain a group which can be removed under the dyeing conditions and which carries at least one water-solubilising group.

The invention therefore provides dyes of the formula

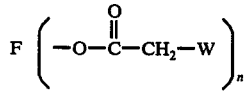 (I)

wherein F is a dye of the disperse class, especially an anthraquinone or an azo dye, n is 1 or 2, and W is the radical of a diammonium or aminoammonium compound which is linked to the methylenecarbonyloxy radical through one of the two ammonium groups.

The new dyes are obtained either by
a. reacting the dye of the formula

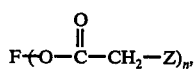 (II)

wherein F and n having the meanings previously assigned to them and Z is a labile acyl group of a strong acid, for example sulphuric acid or especially one of the hydrohalic acids, with n moles of a diamine which contains at least one alkylatable nitrogen atom, and, if appropriate, subsequently quaternising the non-quaternised nitrogen atoms with alkylating agents, or
b. coupling the diazonium compound of a diazo component with a coupling component, at least one of said components containing a radical of the formula

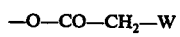

wherein W has the meaning already assigned to it, or
c. condensing two components the combination of which yields the dye and which altogether contain at least one group of the formula

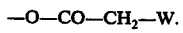

The new dyes are brought into contact with the fibres in a slightly acid, neutral or slightly basic solution under the customary dyeing conditions for synthetic fibres, for example at elevated temperature of about 80° to 130° C and a pH of c. 4 to 8, especially 5 to 7 and above all of about 5.

A reverse formation of the original disperse dye thereby takes place by hydrolysis at the carbacyl group and the dye then exhausts onto the polyester material. Under optimal conditions, the rate of hydrolysis and exhaustion of the water-soluble disperse dye are in such a ratio that the free disperse dye is unable to accumulate, i.e. it exhausts immediately onto the material. The dyebath remains clear and the dyeing can be carried out without dispersants means that the effluent is less heavily polluted and a contribution to the effluent problem is thereby made.

Preferably the new dyes have the formula

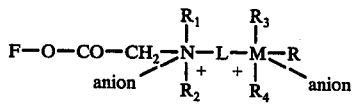 III wherein F has the meaning already assigned to it and $R_1$ is an unsubstituted or a substituted alkyl or aralkyl radical, $R_2$ is an unsubstituted or a substituted alkyl or aralkyl radical, $R_3$ is a hydrogen atom or an unsubstituted or a substituted alkyl or arylkyl radical or together with $R_1$ or $R_4$ is a lower alkylene radical, preferably an athylene radical, $R_4$ is a hydrogen atom or an unsubstituted or a substituted alkyl or aralkyl radical or together with $R_2$ is a lower alkylene radical, preferably an ethylene radical, R is an unsubstituted or a substituted alkyl or aralkyl radical, but is particularly a hydrogen atom, and L is an unsubstituted or a substituted alkylene chain or an alkylene chain which can be interrupted by heteroatoms, such as oxygen, sulphur or nitrogen atoms, or is a direct bond.

Dyes having an especially interesting utility are those of the formula

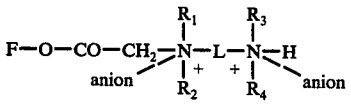 IV wherein F, L, $R_1$, $R_2$, $R_3$ and $R_4$ have the meanings previously assigned to them.

Suitable radicals W are in particular the groups of the formulae

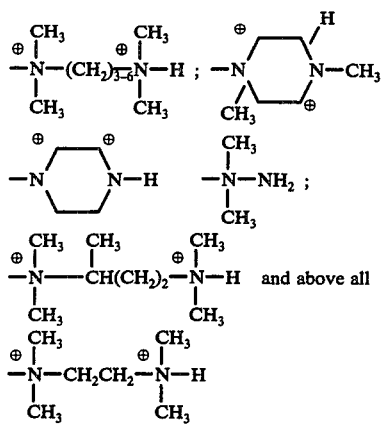

wherein the positive charges are neutralised by a corresponding number of those anions which are customary in quaternised dyes.

The disperse dyes F can belong to any classes of dye. They are, for example, metalliferous monoazo or polyazo dyes, including also formazane dyes, and anthraquinone or acridone dyes, nitro, methine, styryl, naphthoperinone and quinophthalone dyes. Metal-free azo and anthraquinone dyes are preferred.

Azo dyes

Particularly interesting dyes are the azo dyes of the formula $$D-N=N-(A-NR_1'R_2')_{a-1} (B)_{2-a} \qquad V$$

wherein D is the radical of a diazo component, A is an arylene radical, especially an unsubstituted or a substituted 1,4-phenylene radical, $a$ is 1 or 2, each of $R_1'$ and $R_2'$ is an unsubstituted or a substituted alkyl group, and B is the radical of a coupling component, for example a phenyl, an enol, an aminopyrazole, a cyanopyridone or a pyrazolone, and wherein at least one of the radicals, D, A, $R_1'$, $R_2'$ and B contains a group of the formula $$-O-C-CH_2-W$$

wherein W has the meaning previously assigned to it.

To these dyes belong the dyes of the formula

1.

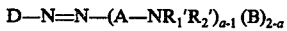

wherein the ring A' can contain in addition further nonwater-solubilizing groups, X is a simple bond, —O—, —SO₂—, —SO₂—NH—, —SO₂—N(alkyl)—, —CO—NH— or —CO—N(alkyl), and which contain only one group of the formula —O—CO—CH₂—W.

2.

$$W-CH_2-\overset{\underset{\displaystyle O}{\|}}{C}-O-\text{alkylene}-X\text{—[A']—}N=N-B', \qquad VII$$

wherein B' is a radical of a coupling component of the phenol, enol, aminopyrazole, indole, pyrimidine or pyridine class, and the aromatic ring A' can contain in addition as substituents lower alkyl or alkoxy groups, halogen atoms, nitro, cyano, lower alkylsulphonyl, or sulphamide groups, and

3.

$$D-N=N-A-N\begin{matrix}R_1'\\ \\R_3'-O-CO-CH_2-W,\end{matrix} \qquad VIII$$

wherein $R_1'$ is an unsubstituted or a substituted alkyl group and $R_3'$ is an alkylene group which can be interrupted by heteroatoms, especially by oxygen atoms.

The dyes classified under (2) include, for example, those dyes of the formulae

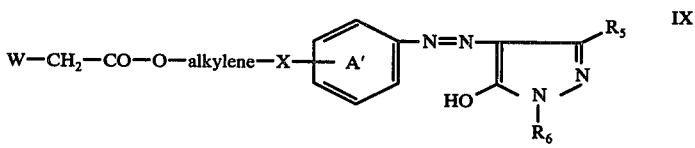

wherein $R_5$ is a lower alkyl or alkoxy group, a phenyl group or an aminocarbonyl group which may be lower alkylated, and $R_6$ is a hydrogen atom, an unsubstituted or a substituted alkyl or aryl group or is a sulphoaryl radical;

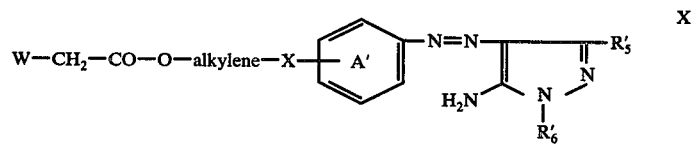

wherein $R_5'$ is a lower alkyl, lower alkoxy or phenyl group and $R_6'$ has the same meaning as $R_6$;

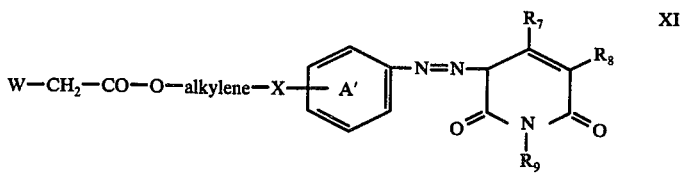

XI wherein $R_9$ is a hydrogen atom, an alkyl group or an aryl group, $R_8$ is a hydrogen atom, an alkyl, aralkyl, aryl or a cyclohexyl group or a heterocyclic radical, an acyl group, a substituted, preferably alkylated, aminocarbonyl group, or preferably a cyano group, $R_7$ is an unsubstituted or a substituted alkyl or aryl group, for example a phenyl group which is substituted, for example, by chlorine, or bromine atoms, methyl, ethyl, methoxy, ethoxy, nitro, hydroxy, trifluoromethyl, acyloxy or acrylamino groups.

Mention may also be made of the dyes of the formulae

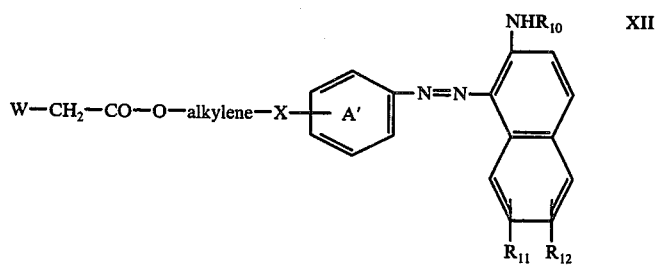

XII wherein $R_{10}$ is a hydrogen atom, a lower alkyl or phenylalkyl group, and $R_{11}$ and $R_{12}$ are each hydrogen or halogen atoms, lower alkyl, lower alkoxy, nitro, sulphonylamido, N-lower alkylsulphonamido or N,N-di-lower alkylsulphonylamido groups;

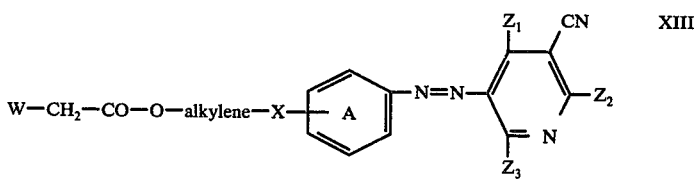

XIII wherein two radicals Z are groups of the formula $-NR_{13}R_{14}$ and the other is a group of the formulae $-NR_{13}R_{14}$, $OR_{15}$ or $-S-R_{15}$, in which each of $R_{13}$, $R_{14}$ and $R_{15}$ is hydrogen, aryl, aralkyl, cycloalkyl or an aliphatic radical and $R_{13}$ and $R_{14}$ are able to form a ring which contains the amino nitrogen and the radicals $-NR_{13}R_{14}$ can be the same or different;

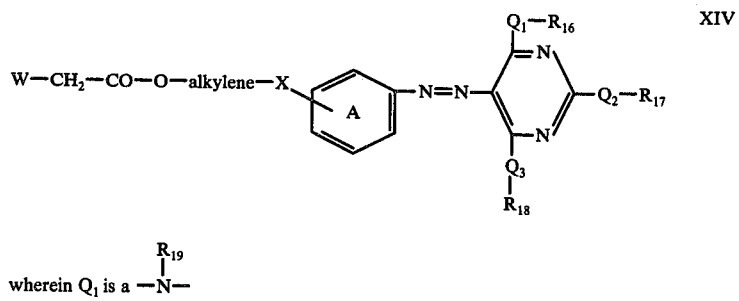

XIV wherein $Q_1$ is a $-\overset{R_{19}}{\underset{}{N}}-$ bridge and each of the other symbols Q is independently an oxygen or a sulphur atom or the $-N(R_{19})$ bridge, wherein $R_{19}$ is hydrogen or a lower alkyl group, and $R_{16}$, $R_{17}$ and $R_{18}$ are unsubstituted or substituted hydrocarbon radicals or hydrogen atoms;

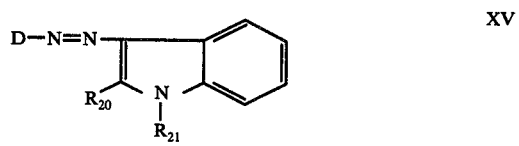

XV wherein D is a radical of a diazo component of the aromatic or heterocyclic class, $R_{20}$ is a hydrogen atom or an organic radical, $R_{21}$ is an organic radical and either D or $R_{21}$ contains the radical of the formula $-O-CO-CH_2-W$.

Interesting subgroups of dyes are those of the formula

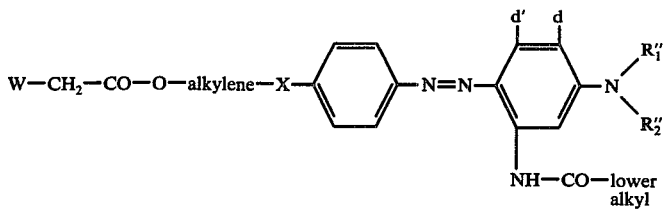

wherein $R_1''$ and $R_2''$ are the same or different and are lower alkyl, phenylethyl, benzyl, cyanoethyl, hydroxy-lower alkyl, lower alkyloxycarbonyloxy-lower alkyl or cyanoethoxyethyl groups and $d$ is a hydrogen, a chlorine or a bromine atom, a lower alkyl, lower alkoxy, lower alkylthio, phenoxy, phenylthio or lower alkyoxycarbonyl radical and ' can be a hydrogen atom or, if $d$ is hydrogen, an acylamino group, for example those of the formula wherein $c$ is a hydrogen or a halogen atom or an acylamino group of a lower monocarboxylic acid or is a methyl group and $R_1'$ is a lower unsubstituted alkyl group or is preferably a phenylethyl, benzyl, cyanoethyl, cyanoethoxyethyl, hydroxylower alkyl or lower alkylcarbonyloxy-lower alkyl group, but is most preferably a lower alkyl group.

These dyes include the dyestuff groups of the formulae

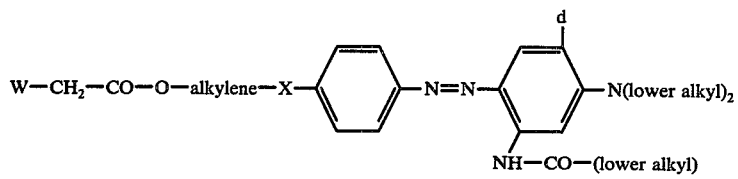

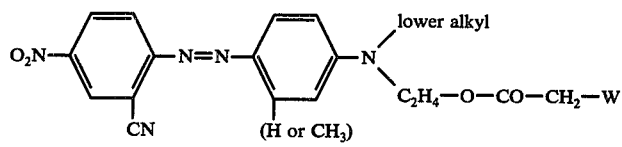

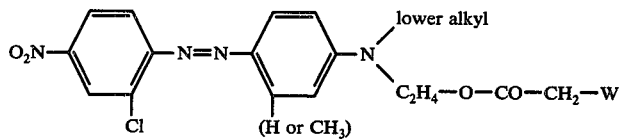

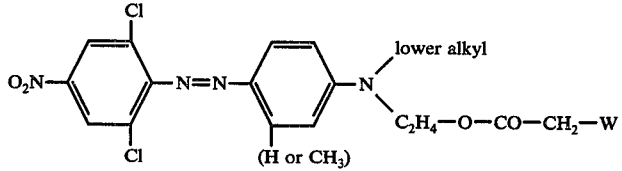

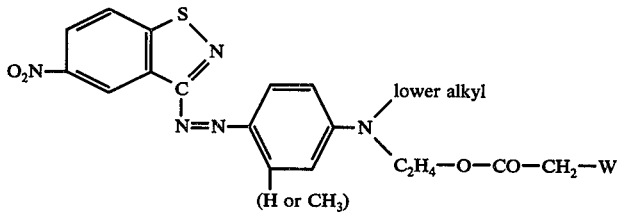

Particularly preferred dyes are those of the

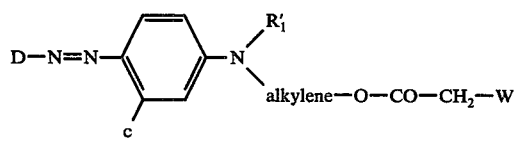

which can of course also contain other diazo radicals than those indicated hereinabove.

Of the dyes which contain a pyrazole radical there may be mentioned in particular those of the formulae

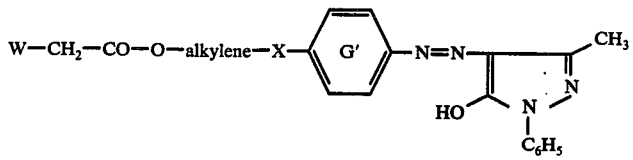

XVI and

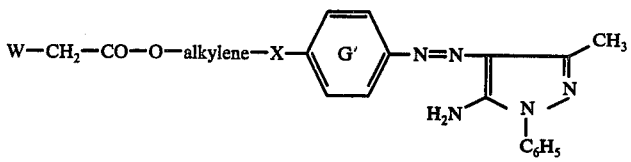

XVIa wherein G' is preferably unsubstituted.

Interesting dyes are those of the formulae

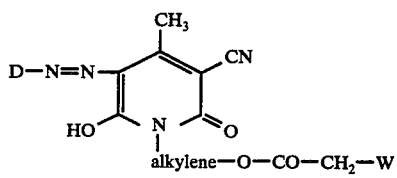

XVII (wherein the alkylene radical contains preferably 1 to 4 carbon atoms and is in particular an ethylene radical),

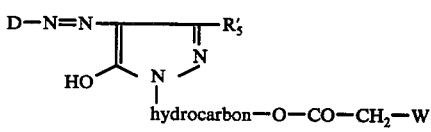

XVIII and

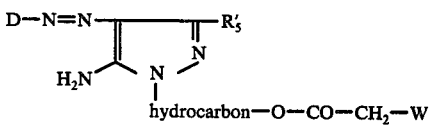

XVIIIa wherein $R_5'$ has the same meaning as in formula X and the hydrocarbon radical is above all lower alkylene and especially ethylene,

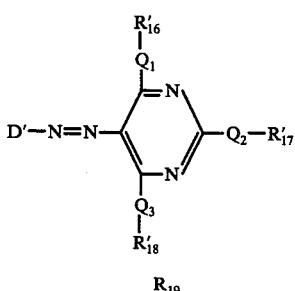

XIX wherein $Q_1$ is a 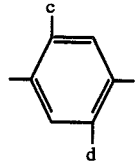

bridge and each of the other symbols Q independently represents an oxygen or a sulphur atom or the $-N(R'_{19})$ bridge, wherein $R_{19}'$ is hydrogen or a lower alkyl group and $R_{16}'$, $R_{17}'$ and $R_{18}'$ are unsubstituted or substituted hydrocarbon radicals or hydrogen atoms and one of the radicals R, preferably $R_{17}$, has the formula hydrocarbon—O—CO—CH$_2$—W, in particular-lower alkylene—O—CO—CH$_2$—W, and D' has the same meaning as D but does not contain any quaternary nitrogen atoms.

In the dyes of group 3, the group A is preferably the radical of the formula

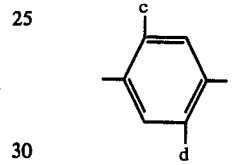

wherein $c$ and $d$ are hydrogen atoms, chlorine atoms, lower alkyl groups, such as methyl, ethyl, lower alkoxy groups, such as methoxy, ethoxy, phenylthio, phenoxy, or lower alkoxycarbonyl groups. Throughout this specification, lower alkyl, lower alkoxy, lower alkyloxycarbonyl groups etc. are, unless otherwise stated, unsubstituted groups of 1 to 5 carbon atoms.

The group $c$ is preferably in ortho-position to the azo group and, in addition to the groups cited hereinbefore, can also be a bromine atom, a trifluoromethyl group, and an acylamino group which may be alkylated, preferably methylated, at the nitrogen atom, and in which the acyl radical is the radical of an organic monocarboxylic acid, an organic monosulphonic acid, such as methane-, ethane- or p-toluenemonosulphonic acid, or the radical of a carbamic acid or of a carbonic acid monoester. Examples of such acyl radicals which can occur in the acylamino radical $c$ are specified hereinafter.

The groups $R_1'$ and $R_2'$ can be hydrogen atoms or lower alkyl groups, i.e. containing 1 to 5, preferably 1 to 4, carbon atoms, such as methyl, ethyl, n-propyl or n-butyl groups, which can be interrupted by oxygen atoms and/or substituted in the customary manner. Possible substituents are: halogen atoms, preferably fluorine, chlorine or bromine atoms, lower alkoxy, lower alkylcarbonyloxy, lower alkylcarbonylamino, benzoyloxy, benzoylamino, cyano, hydroxy, lower alkylsulphonyloxy, phenylsulphonyloxy, cyanoethoxy, phenyl, lower alkylsulphonyl, lower alkoxycarbonyloxy, lower alkylaminocarbonyloxy, phenoxycarbonyloxy, phenylaminocarbonyloxy groups and groups of the formula —O—CO—CH$_2$—W.

Possible groups $R_1'$ and/or $R_2'$ are, for example, those of the formulae —CH$_3$, —C$_2$H$_5$, —C$_3$H$_7$, —C$_4$H$_9$, —CH$_2$CH$_2$Cl, —CH$_2$CH$_2$Br, —CHCl—CH$_2$Cl, —CH$_2$CH$_2$CN, —CH$_2$—CH(OH)—CH$_2$Cl, —CH$_2$C$_6$H$_5$—, —CH$_2$CH$_2$C$_6$H$_5$, —CH$_2$CH$_2$OH, —CH$_2$CH$_2$—O—CH$_3$, —CH$_2$CH$_2$—O—C$_4$H$_9$, —C$_4$H$_8$—O—C$_4$H$_9$, —CH$_2$CH$_2$—O—CH$_2$CH$_2$—OCH$_3$, —CH$_2$CH$_2$—O—CH$_2$CH$_2$—OH, —CH$_2$CH$_2$—O—CH$_2$CH$_2$—OCOCH$_3$, —C$_2$H$_4$—O—C$_2$H$_4$—CN, —(CH$_2$)$_{1-3}$—CO—O—(CH$_3$,C$_2$H$_5$,C$_3$H$_7$,C$_4$H$_9$,C$_6$H$_5$), —(CH$_2$)$_{1-3}$—CO—NH—(CH$_3$,C$_2$H$_5$,C$_3$H$_7$,C$_4$H$_9$,C$_6$H$_5$), —CH$_2$—CH$_2$—O—COCH$_2$Cl, —CH$_2$CH$_2$—O—CO—CHBr—CH$_2$Br, —CH$_2$—CH—(OCOCH$_3$)—CH$_2$—O—C$_6$H$_5$, —CH$_2$—CH$_2$—O—CO—CH=CH$_2$, —CH$_2$—CH(OCOCH$_3$)—CH$_2$OCOCH$_3$, —(CH$_2$)$_{1-3}$—O—CO(H,CH$_3$,C$_2$H$_5$,C$_3$H$_7$,C$_4$H$_9$), —(CH$_2$)$_{1-3}$—NH—CO(H, CH$_3$,C$_2$H$_5$,C$_3$H$_9$,C$_4$H$_9$), —(CH$_2$)$_{1-3}$—O—CO(C$_6$H$_5$, C$_6$H$_4$Cl, C$_6$H$_4$Br, C$_6$H$_4$OCH$_3$, C$_6$H$_4$CH$_3$), —(CH$_2$)$_{1-3}$—O—CO—O(CH$_3$,C$_2$H$_5$,C$_3$H$_7$,C$_4$H$_9$), —(CH$_2$)$_{1-3}$—O—CO—O(C$_6$H$_5$, C$_6$H$_4$Cl, C$_6$H$_4$Br, C$_6$H$_4$OCH$_3$, C$_6$H$_4$CH$_3$), —(CH$_2$)$_{1-3}$—O—CO—NH(CH$_3$, C$_2$H$_5$, C$_3$H$_7$, C$_4$H$_9$), —(CH$_2$)$_{1-3}$—O—CO—NH(C$_6$H$_5$, C$_6$H$_4$Cl, C$_6$H$_4$Cl, C$_6$H$_4$OCH, C$_6$H$_4$CH$_3$) —CH$_2$CH$_2$—O—CH$_2$—O—C$_6$H$_5$ and —CH$_2$CH$_2$—O—CO—CH$_2$—C$_6$H$_5$.

As hydrocarbon radicals which occur in the above formulae, there may be mentioned above all aliphatic radicals in addition to aromatic and araliphatic radicals. Suitable aliphatic hydrocarbon radicals are those of the formulae
—CH$_2$—, —CH$_2$CH$_2$—, —CH$_2$CH$_2$CH$_2$—, —CH$_2$CH$_2$CH$_2$CH$_2$—,

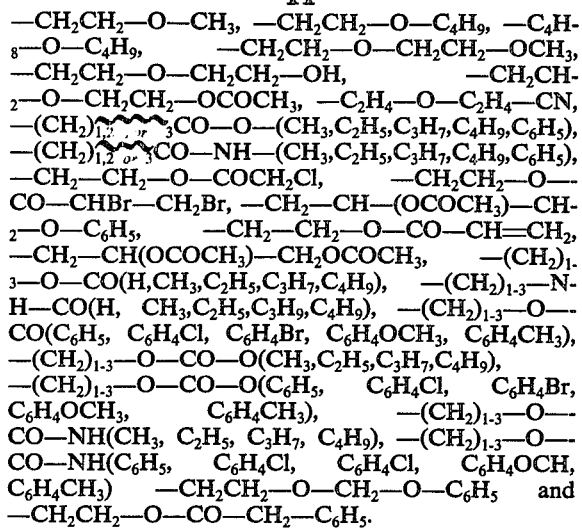

The radical R$_5$ in the dyes of the formula IX is, for example, hydrogen, methyl, ethyl, propyl, butyl, cyano, methoxy, ethoxy, propoxy, butoxy, phenoxy, p-tolyloxy, phenyl-(methyl-, ethyl-, propyl-, butyl-)oxycarbonyl, aminocarbonyl, aminosulphonyl, N-mono-(methyl-, ethyl-, propyl-, butyl)aminosulphonyl, N-di-(methyl-, ethyl-, propyl, butyl)aminosulphonyl, N-bis-(hydroxyethyl)aminosulphonyl.

The radical R$_6$ is, for example, a radical of the formula

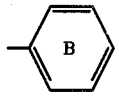

wherein the ring B can in addition be substituted by chlorine, bromine, nitro, trifluoromethyl, methyl, ethyl, propyl, butyl, methoxy, ethoxy, propoxy, butoxy, methylsulphonyl, ethylsulphonyl, phenoxysulphonyl, (methyl-, ethyl-, propyl-, butyl)carbonylamino, benzoylamino, (methyl-, ethyl-, propyl-, butyl)sulphonylamino, aminosulphonyl, N-(methyl-, ethyl-, propyl-, butyl)aminosulphonyl, N,N-di-(methyl-, ethyl-, propyl-, butyl)aminosulphonyl, —CH$_2$—C$_6$H$_5$, —CH$_2$CH$_2$—C$_6$H$_5$, —C$_6$H$_{11}$, —(CH$_2$)$_{1-6}$—O—CO-(methyl, ethyl, propyl, butyl), —CH$_2$)$_{1-3}$—NH—CO-(methyl, ethyl, propyl, butyl).

As radicals R$_7$ there may be mentioned methyl, ethyl, propyl, isopropyl, butyl, hydroxyethyl, methoxy or methoxypropyl, ethoxyethyl, cyanomethyl, aminocarbonyloxyethyl, and acetylmethyl, benzyl, phenyl, methoxyphenyl, chlorophenyl, nitrophenyl, toluyl, bromophenyl, aminocarbonyl, 2-pyridyl, 2-thiazolyl, 1-piperidinyl and 1-morpholinyl groups.

Examples of radicals R$_8$ are the hydrocarbon radicals cited in respect of R$_7$ as well as the aminocarbonyl radical, which can be N-alkylated, and in particular the cyano group.

Possible radicals R$_9$ are the hydrocarbon radicals of the aliphatic, cycloaliphatic, araliphatic and aromatic classes cited in respect of R$_7$.

The radical R$_{10}$ is normally a hydrogen atom, a methyl, ethyl, propyl, butyl, benzyl, phenylethyl, hydroxyethyl or cyanoethyl group.

Each of the radicals R$_{11}$ and R$_{12}$ is independently hydrogen, chlorine or bromine, methyl, ethyl, propyl, butyl, methoxy, ethoxy, propoxy, nitro, aminosulphonyl, N-(methyl-, ethyl-, propyl-, hydroxyethyl-)aminosulphonyl, N,N-bis-(methyl-, ethyl-, propyl-, butyl-, hydroxyethyl)aminosulphonyl, methyl- or ethylsulphonyl, (methoxy-, ethoxy)sulphonyl.

Examples of the radicals R$_{13}$, R$_{14}$ and R$_{15}$ which occur in the dyes of the formula (V) are methyl, ethyl, propyl, isopropyl, butyl, sec. butyl, n-pentyl and octyl radicals, which can be interrupted by oxygen atoms and substituted by hydroxy, carbodyl, carbalkoxy of 2 to 6 carbon atoms, for example (methyl-, ethyl-, propyl-, butyl) oxycarbonyl, alkoxy of 1 to 8 carbon atoms, for example methoxy, ethoxy, propoxy, butoxy, hexyloxy or pentyloxy, phenoxy, acyloxy of 1 to 10 carbon atoms, phenyl groups which are unsubstituted or substituted by halogen, such as chlorine, bromine or fluorine, propoxy, butoxy, methyl, ethyl, propyl, butyl, β-hydroxyethyl, ethoxycarbonyl, methoxycarbonyl, propoxycarbonyl or butoxycarbonyl, or by benzyl or phenethyl or cyclohexyl, or the radicals R$_6$ and R$_7$ together are linked to a piperidine, pyrrolidine, morpholine, piperazine or methylpiperazine ring.

Examples of possible acyl radicals, especially those which occur in the radical c if this contains an acylamino group, are fatty acid radicals of up to 5 carbon atoms, e.g. formyl, acetyl, propionyl, butyryl radicals; alkylcarbamyl radicals of up to 5 carbon atoms, such as methylaminocarbonyl, ethylaminocarbonyl, propylaminocarbonyl or butylaminocarbonyl radicals; alkoxycarbonyl radicals of up to 5 carbon atoms, such as methoxycarbonyl, ethoxycarbonyl, propoxycarbonyl or butoxycarbonyl radicals; phenylcarbamyl or phenoxycarbonyl radicals, benzoyl, phenoxyacetyl, chloroacetyl or phenylacetyl radicals.

The radicals R$_{16}$, R$_{17}$ and R$_{18}$ which are contained in the dyes of the formula XIV are, for example, straight-chain or branched alkyl radicals of up to 8 carbon atoms which are unsubstituted or substituted by hydroxy or cyano groups, lower alkoxy groups, lower alkanoyloxy groups or by primary, secondary or tertiary amino groups, or cyclohexyl groups, benzyl groups, and phenyl radicals which are unsubstituted or substituted by halogen atoms, nitro groups, acetyl groups, benzoyl groups, cyano groups, thiocyano groups, lower alkyl groups, lower alkoxy groups, trifluoromethyl groups, lower alkylsulphonyl groups, phenoxysulphonyl groups, lower alkylphenoxysulphonyl groups, p-toluenesulphonamide groups, lower alkoxycarbonylamino groups, lower alkoxylower alkoxycarbonyl groups, benzoylamino groups, acetylamino groups. The radical $R_{19}$ is, for example, a methyl group or preferably a hydrogen atom.

In the dyes of the formula XIV, 2 radicals are preferably Q—$NR_{19}$ bridges. As a rule, each of $Q_1$ and $Q_3$ is then a —$NR_{19}$ bridge, especially a —NH bridge.

Mention may also be made of diazo dyes which preferably have the formula

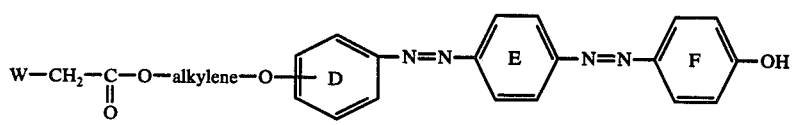

XX wherein the ring D is halogen, cyano, nitro, aminosulphonyl or alkyl, the rings E and F can carry alkyl and/or alkoxy groups and the ring E can also carry a nitro group.

Nitro dyes

Preferred nitro dyes are those of the formula

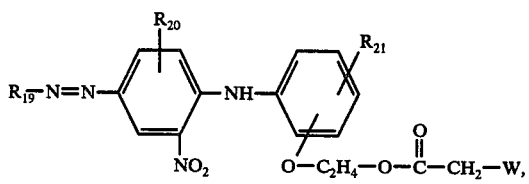

wherein $R_{19}$ is an unsubstituted or a substituted aryl radical, each of $R_{20}$ and $R_{21}$ is a substituent which does not contain any groups which do not dissociate ionically or is a hydrogen atom.

In particular, $R_{19}$ is a radical of a phenolic coupling component, for example of a phenol or cresol, which is substituted by groups which do not dissociate ionically, such as lower alkyl groups, lower alkoxy groups, chlorine, bromine and cyanoethyl groups.

Anthraquinoid dyes

Dyes according to the invention of the anthraquinone class are, for example, anthraquinone derivatives of the formula U — (O—CO—CH$_2$—W)$_n$    XXII wherein n is an integer from 1 to 2, preferably 1, W has the meaning previously assigned to it and U is an anthraquinoid radical with 3 to 5 condensed rings which contain one or more substituents, for example halogen atoms such as fluorine, chlorine or bromine, hydroxy groups, alkoxy groups, amino groups, acylamino groups, alkylamino groups of 1 to 3 carbon atoms, acyloxy groups, unsubstituted or substituted aryl radicals, unsubstituted or substituted heterocyclic radicals, arylamino groups, wherein the aryl radical is preferably a phenyl group which can be substituted by one or more halogen atoms, alkyl or alkoxy groups, alkylsulphonyl groups or phenylsulphonyl groups which are unsubstituted or substituted, alkylthioether radicals or phenylthioether radicals which are unsubstituted or substituted, as well as nitro, cyano, carboxylic acid ester and acetyl groups. Examples of tetracyclic anthraquinone radicals are 1,9-isothiazolanthrone, 1,9-anthrapyramidine or 1,9-pyrazolanthrone. The alkyl radicals are preferably lower alkyl radicals which can contain up to 6 carbon atoms.

Preferred anthraquinone dyes are, for example, those of the formula

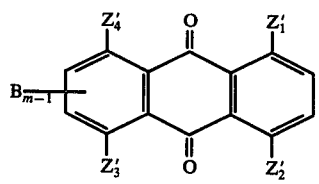

XXIII wherein B is a halogen atom, especially a bromine or a chlorine atom, or an alkyl or alkoxy group, in particular methyl or methoxy, m is 1 or 2 and each of $Z_1'$, $Z_2'$, $Z_3'$ and $Z_4'$ is a hydrogen atom, an amino or a hydroxy group which is unsubstituted or substituted by an alkyl, an aralkyl, a cycloalkyl, an aryl or a heterocyclic radical, a nitro group, or an amino or a hydroxy group which is substituted by an organic acid radical, and wherein at least one of the symbols $Z_1'$, $Z_2'$, $Z_3'$ or $Z_4'$ contains a group of the formula —NH—hydrocarbon radical—O—CO—CH$_2$—W.

Further preferred anthraquinone dyes are, for example, those of the formula

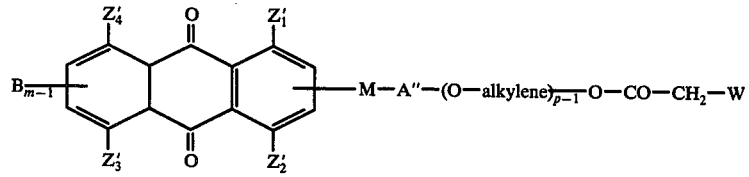

XXV wherein $Z_1'$, $Z_2'$, $Z_3'$, $Z_4'$, B and W have the meanings previously assigned to them, A" is an aliphatic, araliphatic, aromatic or a heterocyclic radical which can be interrupted by heteroatoms or substituted, p is 1, 2 or 3, and M is —O—, —S—, —NH—, —NR—, a direct bond, a sulphonyl, sulphonyloxy or sulphonylamino group, and R has the meaning previously assigned to it.

Dyes having a particularly interesting utility are those of the formulae

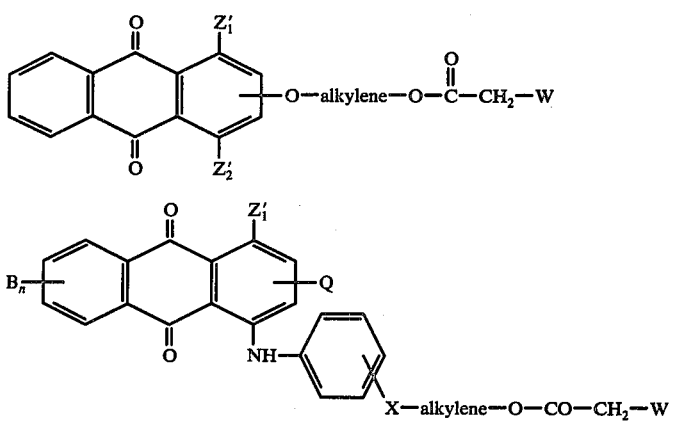

wherein $Z_1'$, $Z_2'$ are hydroxy groups or amino groups which are unsubstituted or substituted by alkyl or aryl groups, Q is a hydrogen atom, a cyano, carbalkoxy or carbonamido group or a halogen atom. Important dyes are also acridone dyes of the formula

XXVI

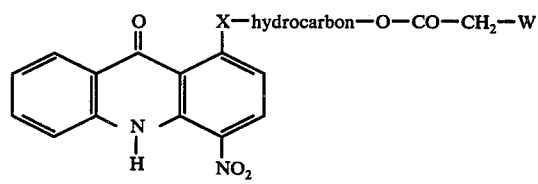

wherein X is a sulphur or an oxygen atom.

The diamines which form the radical W can be obtained by complete alkylation of diprimary or primary-secondary or disecondary amines. Exemplary of such amines are: 1,2-diaminoethane, 1,2- or 1,3-diaminopropane, 1,2- or 1,3-diaminopropane, 1,2- or 1,3- or 1,4- or 2,3-diaminobutane, 1,2- or 1,3-diaminopentane or 1,4- or 1,5-diaminopentane or 2,3 or 2,4-diaminopentane, the corresponding diaminohexanes, -heptanes, -octanes, -nonanes, -decanes, -undecanes, -dodecanes, -hexadecanes, -octadecanes, 1,4-diamino-2-methylbutane, 1,5-diamino-2,2-dimethylpentane, 1,5-diamino-2,2,4-trimethylpentane, di(β-aminoethyl)-thioether, di(γ-aminopropyl)-ether, di-(γ-aminopropyl)-thioether, butylene glycol dipropyl ether-ω,ω'-diamine, di-(ω-aminohexyl)-thioether, bis(2-aminoethyl)-amine, dipropylene(1,2)-triamine, tripropylene-(1,2-)tetramine, bis-(3-aminopropyl)-amine, bis-(3-aminopropyl)-methylamine, N,N'-dimethyldiaminoethane-1,2, N,N'-diethyldiaminoethane-1,2, 1-amino-3-methylaminopropane, piperazine, N-2-aminoethylpiperazine, 4-aminopiperidine, ω,ω'-diamino-1,3-(or -1,4)-dimethylbenzene, ω,ω'-diamino-1,4-(or -1,2-)-dimethylcyclohexane, ω,ω'-diamino-1,4-diethylbenzene, ω,ω'-diamino-1,4-(or -1,5)-dimethylnaphthalene, ω,ω'-diamino-di-n-propylbiphenyl, 1,2- or 1,3- or 1,4-diaminocyclohexane, 1-methyl-2,4-diaminocyclohexane, 1-ethyl-2,4-diaminocyclohexane, 4,4'-diaminodicyclohexylmethane, 4,4'-diaminodicyclohexylmethylmethane, 4,4'-diaminodicyclohexyldimethylmethane, 4,4'-diamino, 2-2'-dimethyldicyclohexylmethane, 4,4'-diamino-3,3'-dimethyldicyclohexylmethane, 3-methyl-heptamethylene-diamine, 4,4-dimethyl-heptamethylene-diamine, 2,11-diaminododecane, 1,2-bis-(3-amino-propoxy)ethane, 2,2-dimethylpropylene-diamine, 3-methoxyhexamethylene-diamine, 2,5-dimethyl-hexamethylene-diamine, 2,5-dimethyl-heptamethylenediamine, 5-methylnonamethylene-diamine, $H_2N(CH_2)_2$—$O(CH_2)_3NH_2$, $H_2N(CH_2)_3N(CH_3)(CH_2)_3NH_2$, diamines, triamines, amides, such as the compounds obtained by hydrogenation of adducts of acrylonitrile and primary and secondary amines, for example bis-(3-aminopropyl)-methylamine, bis-(3-aminopropyl)-cyclohexylamine, bis-(3-aminopropyl)-aniline, bis-(3-aminopropyl)toluidine, diaminocarbazole, bis-(aminopropoxyethyl)-butylamine, tris-(aminopropyl)-amine, N,N'-bis-carbonamido-propyl-hexamethylene-diamine, $(CH_3)_2N$-$CH_2CH_2NH_2$, $(C_4H_9)_2N$-$CH_2CH_2NH_2$,

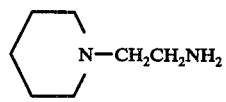

$(CH_3)_2N$-$CH_2CH_2CH_2NH_2$, $(C_3H_7)_2N$-$CH_2CH_2CH_2NH_2$,

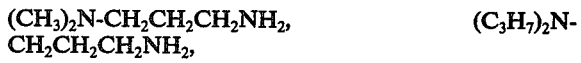

$(C_2H_5)_2N$—$CH_2CH_2CH_2CH_2NH_2$,
$(C_4H_9)_2N$—$CH_2CH_2CH_2CH_2NH_2$,

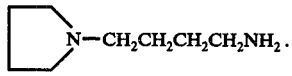

As a rule, the completely alkylated diamines which do not, however, contain any quaternary nitrogen atoms, are reacted in organic media such as methyl ethyl ketone, acetone, acetonitrile and the like with haloacetic esters of disperse dyes, i.e. with compounds of the formula F——(O—CO—$CH_2$-halogen)$_n$.

The salt-like reaction products are substantially insoluble in the above media and can be isolated by filtration.

Normally one chloracetic ester dye molecule reacts with one molecule of amine. A surplus of amine is generally used in order to prevent a double reaction of two molecules of dye with one molecule of diamine.

If at least one of the amino substituents R, $R_3$ and $R_4$ is a hydrogen atom, then the dyes can also be in the nonprotonised form, depending on the pH. But under dyeing conditions of below about pH 6 they are transformed into the positively charged, protonised form.

Dyes in which one of the substituents R, R₃ and R₄ is hydrogen are expediently obtained by reaction of the above mentioned monoquaternary dyes with alkylating agents, such as dimethyl sulphate, methyl iodide, benzyl chloride and the like.

Examples of completely alkylated diamines are:
1,2-bis(dimethylamino)ethane
1,3-bis(dimethylamino)propane
1,3-bis(dimethylamino)propane
1,2-bis(dimethylamino)propane
1,4-bis(dimethylamino)butane
1,3-bis(dimethylamino)butane
1,3-bis-dimethylamino-2-methylpropane
2,3-bis(dimethylamino)butane
1,5-bis-dimethylamino-2-pentene
1,5-bis(dimethylamino)pentane
2,3-bis-dimethylamino-2-methylbutane
1,6-bis(dimethylamino)hexane
1,7-bis(dimethylamino)heptane
3,4-bis-dimethylamino-3,4-dimethylhexane
1,10-bis(dimethylamino)decane
1,12-bis(dimethylamino)dodecane
1-dimethylamino-2-diethylamino-ethane
1-dimethylamino-2-(dimethylaminomethyl)butane
1,2-bis(diethylamino)ethane
1,3-bis(diethylamino)propane
4-dimethylamino-1-diethylamino-pentane
1,4-bis(dimethylamino)1,3-butadiene
1,3-bis-(diethylamino)-1-butane
1-dimethylamino-2-(isopropylpentylamino)-ethane
1-dimethylamino-2-(methylheptylamino)-ethane
bis-(dialkylamino)-methane
1-dimethylamino-2-(alkylhexylamino)-ethane
1-dimethylamino-2-(methyloctylamino)-ethane
1-dimethylamino-2-(butyloctylamino)-ethane
1,4-bis-(diisopropylamino)-2-butene
1,16-bis-(dimethylamino)-hexadecane
1-dimethylamino-2-(methylpentadecylamino)-ethane.

Examples of suitable triamines and tetramines are:
methyl-bis-(2-dimethylaminoethyl)-amine
ethyl-bis-(2-diethylaminoethyl)-amine.

It is preferred to use those amines in which the nitrogen atoms are separated only by two carbon atoms, i.e. amines which yield, for example, the following groups W:

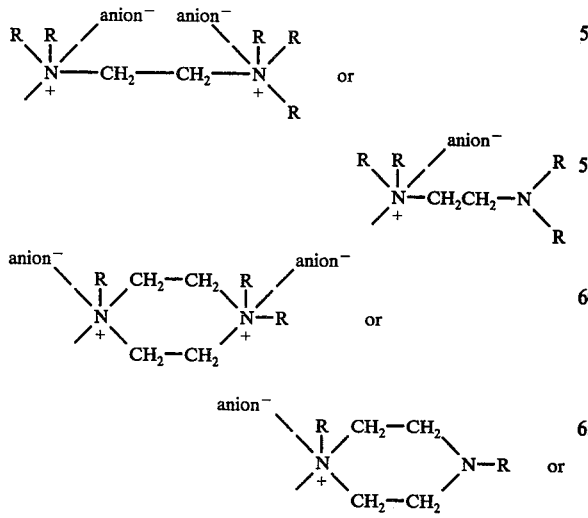

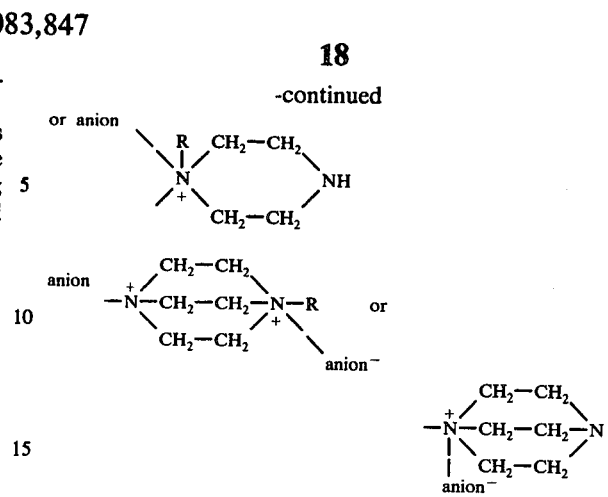

The azo dyes according to the invention can also be obtained by coupling a diazonium compound of an amine with a coupling component, with at least one of the components having to contain a group of the formula -alkylene—O—COCH₂W.

Suitable diazo components which contain the groups of the formula

—OCOCH₂W have e.g. the formula

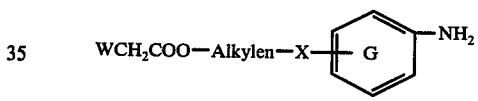

wherein X has the meaning assigned to it in formula VI and the ring G can be substituted by lower alkyl, alkoxy, chlorine and bromine, lower alkylsulphonyl, nitro or cyano. Particular examples are the anilines of the formulae

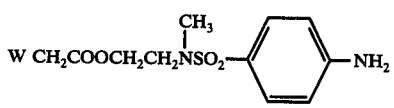

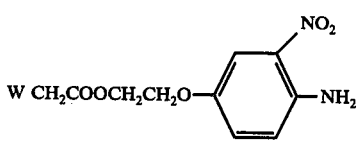

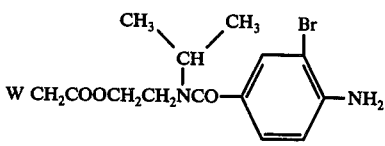

Examples of aromatic diazo compounds with the radical OCOCH₂W are those of the naphthalene and especially of the benzene class. As substituents of the benzene ring there may be mentioned primarily halogen atoms, especially chlorine and bromine, nitro, cyano, thiocyano, trifluoromethyl, alkyl, alkoxy, aryloxy, alkylmercapto, arylmercapto, carboxy amide, acyl and acylamino radicals as well as phenylazo groups, wherein the phenyl nucleus can be substituted by chlorine, nitro, alkyl and alkoxy.

By "alkyl" and "alkoxy" are meant in this connection low molecular radicals of 1 to 5 carbon atoms, preferably methyl and methoxy. "Acyl" denotes radicals of aliphatic and aromatic carboxylic, sulphonic and sulphonic acids, especially benzoyl (which may be substituted at the benzene nucleus), benzenesulphonyl, benzylsulphonyl radicals, as well as radicals of alkylsulphonic acids which contain at most 4 carbon atoms, and aliphatic carboxylic acids. The sulphonic and carboxylic acid amide groups can carry one or two alkyl groups which can also be linked to a ring.

Such aminobenzenes can, for example, be substituted according to the formula

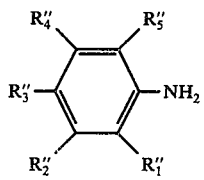

wherein $R_1''$ is hydrogen, bromine, thiocyano, alkoxysulphonyl, hydroxy, alkylmercapro, arylmercapto, acylamino, acyl, or preferably chlorine, nitro, cyano, acyl, sulphonamide, carboxy amide, alkoxy or aryloxy, $R_2''$ is bromine, carboxy amide, alkoxycarbonyl or preferably hydrogen, $R_3''$ is hydrogen, bromine, chlorine, thiocyano, aryloxy or acylamino or preferably nitro, cyano, sulphonamide, carboxy amide, trifluoromethyl or phenylazo, wherein the phenyl nucleus can be substituted by alkyl, alkoxy, nitro and chlorine, $R_4''$ is bromine, nitro, cyano, thiocyano, acyl, carboxy amide, alkoxy, aryloxy or acylamino, chlorine, sulphonamide, trifluoromethyl or alkyl, or is preferably hydrogen, $R_5''$ is in particularly hydrogen, chlorine or bromine, nitro, cyano, thiocyano, acyl, trifluoromethyl or alkyl.

Acyl, alkyl and alkoxy have the same meanings in this connection as stated previously hereinbefore.

Examples of such acyl radicals are: benzoyl, 4-chlorobenzoyl, 4-methylbenzoyl, benzenesulphonyl, acetyl, propionyl, chloroacetyl or methylsulphonyl radicals.

It is further to be borne in mind that 2 strong electron acceptors, i.e. electrophilic substituents like nitro or acyl groups, may never be in ortho-position to each other. But the opposite is possible with of halogen atoms, cyano and alkoxycarbonyl groups. Hydroxy, alkoxy and alkyl groups or halogen atoms are preferably in orthoposition to strong electron acceptors.

Examples of compounds belonging to the class of useful diazo components of the benzene class are:
1-amino-3- or -4-chlorobenzene,
1-amino-4-bromobenzene,
1-amino-2-, -3- or -4-methylbenzene,
1-amino-2-, -3- or -4-nitrobenzene,
1-amino-4-cyanobenzene,
1-aminobenzene-3- or -4-methylsulphone,
1-amino-2-chlorobenzene-4-methylsulphone,
1-amino-2,5-dicyanobenzene,
1-amino-4-carboethoxybenzene,
1-amino-2,4- or 2,5-dichlorobenzene,
1-amino-2,4-dibromobenzene,
1-amino-2-methyl-4- or -6-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene,
1-amino-2-chloro-4-nitrobenzene,
1-amino-2-methoxy-4-nitrobenzene,
1-amino-2-chloro-4-carboethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,5- or 2,6-dichlorobenzene-4-sulphonic acid dimethylamide,
1-amino-2-chlorobenzene-4-sulphonic acid dimethylamide,
1-amino-2-cyano-4-nitro-6-chlorobenzene,
1-amino-2,6-dibromobenzene-4-sulphonic acid amide,
1-amino-2,6-dicyano-4-nitrobenzene,
1-amino-2,4-dinitro-6-chloro- or -6-bromobenzene,
1-amino-2,4-dicyano-6-chlorobenzene,
1-amino-2,4,6-trichloro- or -tribromobenzene,
1-aminobenzene-3- or -4-sulphonic acid amide,
1-aminobenzene-3- or -4-sulphonic acid -N-methyl- or -diethylamide,
4-aminoazobenzene,
4-amino-2'-chloro-azobenzene,
1-amino-2-cyano-4-nitrobenzene,
1-amino-2-cyano-4-nitro-6-bromobenzene,
4-amino-2',4'-dichloro-azobenzene,
4-amino-3'-chloro-azobenzene,
4-amino-2'-nitro-azobenzene,
1-amino-4-nitrobenzene-2-methylsulphone,
4-amino-3-nitro-azobenzene,
4-amino-3'-nitro-azobenzene,
4-amino-2-methyl-azobenzene,
4-amino-4'-methoxy-azobenzene,
4-amino-3-nitro-2'-chloro-azobenzene,
4-amino-3-nitro-4'-chloro-azobenzene,
4-amino-3-nitro-2',4'-dichloro-azobenzene,
4-amino-3-nitro-4'-methoxy-azobenzene,
4-aminodiphenyl and
2- or 4-aminodiphenyl ether.

Possible diazo components are also any kind of diazotisable heterocyclic amines which do not contain any acid, water-solubilising substituents. These amines derive, for example, from the thiazole, benzthiazole, naphthothiazole, isothiazole, isothiazole, benzisothiazole, imidazole, benzimidazole, thiadiazole, pyridine, quinoline, indazole, selenazole, oxazole, oxdiazole, benzoxazole, pyrazole or triazole class.

Suitable substituents of these amines are: phenyl and phenylazo groups, it being possible for the phenyl rings to carry additional substituents, such as chlorine, nitro, alkyl, alkoxy and alkylmercapto radicals, each with 1 to 4 carbon atoms, halogen, in particular bromine and chlorine, sulphamoyl, trifluoromethyl, cyano, thiocyano, nitro, arylkyl, in particular benzyl, cycloalkyl, in particular cyclohexyl radicals, as well as alkyl, alkoxy, alkylmercapto, alkylsulphonyl, alkoxycarbonyl, alkanoyl and N,N-dialkylsulphonamide groups, in particular those radicals with 1 to 4 carbon atoms.

Preferred amines are those which contain a heterocyclic 5-membered ring with 2 or 3 heteroatoms, chiefly one nitrogen and one or two sulphur, oxygen or nitrogen atoms as heteroatoms, i.e. in particular the amines of the thiazole, benzthiazole, isothiazole benzisothiazole and thiadiazole classes.

Preferred substituents of these amines are: halogen, especially chlorine or bromine, nitro, cyano, trifluoromethyl, alkyl and alkoxycarbonyl radicals, each with 1 to 4 carbon atoms, phenyl and the above mentioned substituted phenyl radicals. Examples of such heterocyclic diazo components are:
2-aminothiazole,
2-amino-5-nitrothiazole,
2-amino-5-methylsulphonyl-thiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
3-amino-1-(4'-methoxyphenyl)-pyrazole,
2-aminobenzthiazole,
2-amino-6-methylbenzthiazole,
2-amino-6-methoxybenzthiazole, and the other radicals R" have the meaning previously assigned to them.

Suitable coupling components which contain one or two groups of the formula alkylene-OCOCH$_2$W can be obtained by reaction of a coupling component with the group of the formula -alkylene-OCOCH$_2$C and the amine of the formula HW. Examples of such starting materials are, for example, those of the formulae

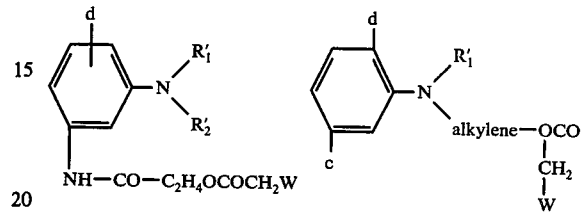

wherein $c$, $d$, $R_1'$, $R_2'$ and $R_1$ have the meanings previously assigned to them.

Coupling components with the group -O-CO-CH$_2$-W have, for example, the formulae

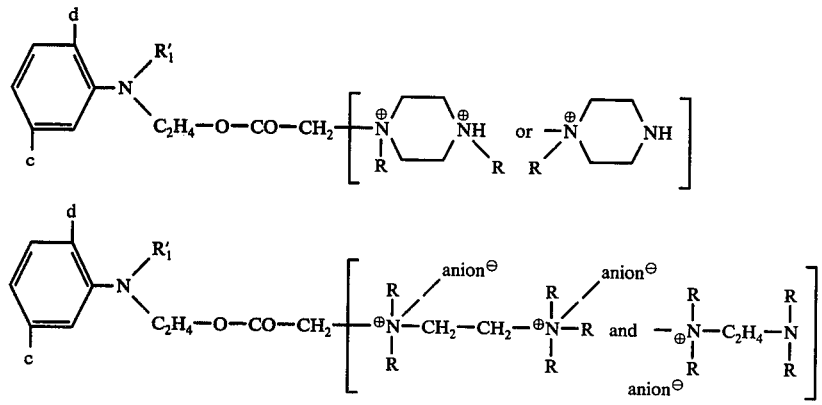

2-amino-6-chlorobenzthiazole,
2-amino-6-cyanobenzthiazole,
2-amino-6-nitrobenzthiazole,
2-amino-6-carboethoxybenzthiazole,
2-amino-6-methylsulphonylbenzthiazole,
2-amino-1,3,4-thiadiazole,
2-amino-1,3,5-thiadiazole,
2-amino-4-phenyl- or -4-methyl-1,3,5-thiadiazole,
2-amino-5-phenyl-1,3,4-thiadiazole.

Particular mention is to be made of the diazo components of the formula

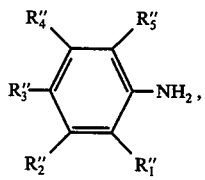

wherein $R_1''$, $R_2''$, $R_3''$, $R_4''$, or $R_5''$ is a radical of the formula -alkylene-OCOCH$_2$W Such coupling components can be obtained, for example, by acylating corresponding coupling components which contain a free hydroxy group with α-bromo- or α-chloroacetic chloride and then reacting the acylation products with amines and, if appropriate, quaternising them. Examples of such acylatable coupling components are:
N-β-hydroxyethyl-N-ethyl-aniline
N-β-hydroxypropyl-N-ethyl-aniline
N-β-hydroxyethyl-N-cyanoethylaniline
N,N-bis-β-hydroxyethylaniline
3-acetamino-6-methoxy-N,N-bis-β-hydroxyethylaniline
and
1-β-hydroxyethyl-3-methylpyrazolone-(5).

Suitable coupling components without a group of the formula —O—CO—CH$_2$—W are the customary coupling components of the aniline, phenol, enol or heterocyclic class.

Besides the phenols, such as m- or p-cresol, resorcinol, 1-hydroxy-4-cyanoethyl-benzene, there may be mentioned as coupling components of the benzene class in particular the aminobenzenes, for example aniline, 3-methylaniline, 2-methoxy-5-methylaniline, 3-acetylamino-1-aminobenzene, N-methylaniline, N-β-hydroxyethylaniline, N-β-methoxyethylaniline, N-β-cyanoethylaniline, N-β-chloroethylaniline, dimethyl aniline, diethyl aniline, N-methyl-N-(benzyl- or β-phenylethyl)-aniline, N-n-butyl-N-β-chloroethylaniline, N-(Methyl-, ethyl-, propyl- or butyl-)-N-β-cyanoethylaniline, N-methyl-N-β-hydroxyethylaniline, N-ethyl-N-β-chloroethylaniline, N-methyl-N-β-acetoxyethylaniline, N-ethyl-N-β-methoxyaniline, N-β-cyanoethyl-N-β-chloroethylaniline, N-β-cyanoethyl-N-(acetoxy- or benzoyloxyethyl)- aniline, N,N-di-β-hydroxyethylaniline, N,N-di-β-acetoxyethylaniline, N-ethyl-N-2-hydroxy-3-chloropropylaniline, N,N-di-β-cyanoethylaniline, N,N-di-β-cyanoethyl-3-methylaniline, N-β-cyanoethyl-N-β-hydroxyethyl-3-chloroaniline, N,N-di-β-cyanoethyl-3-methoxy-aniline, N,N-diethyl-3-acetylamino-aniline, N-ethyl-N-β-cyanoethyl-3-acetylaminoaniline, N,N-di-β-cyanoethyl-2-methoxy-5-acetyl-aminoaniline, N-methyl-N-phenacylaniline, N-β-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and in addition, for example, amines of the formula

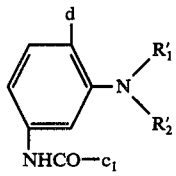

wherein $c_1$ is a hydrogen, an unsubstituted or a substituted alkyl, cycloalkyl or alkoxy group or a benzene residue.

In addition to the naphthols, there may be mentioned as coupling components of the naphthalene class 1- or 2-naphthylamine as well as 2-phenylaminonaphthalene, 1-dimethylaminonaphthalene or 2-ethylaminonaphthalene. Examples of coupling components of the heterocyclic class are the indoles, e.g. 2-methylindole, 2,5-dimethylindole, 2,4-dimethyl-7-methoxyindole, 2-phenyl- or 2-methyl-5-ethoxyindole, N,β-cyanoethyl-2-methyl-indole, 2-methyl-5-or 2-methyl-6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or 2-methyl-5-bromoindole, 2-methyl-5,7-dichloroindole, or 2-phenylindole, 1-cyanoethyl-2,6-dimethylindole, pyridines, e.g. 3-cyano-2,6-dihydroxy-4-methylpyridine, and also pyrazoles, for example 1-phenyl-3-methyl-5-amino-pyrazole or 3-methylpyrazolone-5 or 1-phenyl-3-methyl-pyrazolone-5, 1,3-dimethyl-pyrazolone-5, 1-butyl-3-methylpyrazolone-5, 1-oxyethyl-3-methylpyrazolone-5, 1-cyanoethyl-3-methylpyrazolone-5, 1-(o-chlorophenyl)-3-methyl-pyrazolone-5, 3-carbomethoxy-pyrazolone-5, quinolines, e.g. 8-hydroxyquinoline, 1-methyl-4-hydroxyquinoline, N-ethyl-3-oxy-7-methyl- or N,β-cyanoethyl-1,2,3,4-tetrahydroquinoline, or pyrimidines, e.g. barbituric acid, as well as 1,3-indandione, 1,8-naphthindadione, dimedone, acetoacetic anilide, m-hydroxy-N,N-diethylaniline, 3-hydroxy-4'-methyldiphenylamine, hydroquinone-monoethyl ether, acetyl acetone, 5-hydroxy-benzthiazole and 1,2-diphenyl-pyrazolin-3,5-dione.

The coupling can also be effected in known manner, for example in acid medium, if appropriate in the presence of sodium acetate or similar buffer substances which influence the rate of coupling, or catalysts, for example dimethyl formamide, pyridine and salts thereof.

Anthraquinone dyes according to the invention can be obtained by acylating water-insoluble anthraquinone dyes which contain external aliphatic hydroxy groups with α-bromoacetic or α-chloroacetic chloride and subsequently reacting them with the amines HW.

The novel dyes are excellently suited for printing and especially for dyeing regenerated man-made or preferably synthetic man-made materials, especially textile fibres.

Suitable substrates are, for example, materials like polyacrylonitrile and copolymers of acrylonitrile and other vinyl compounds, e.g. acrylic esters, acrylic amides, vinyl pyridine, vinyl chloride or vinylidene chloride, copolymers of dicyanoethylene and vinyl acetate, as well as of acrylonitrile block copolymers, polyurethanes, synthetic polyamides, e.g. poly(hexamethylene adipic acid amide) or polyamide 66, poly( -caprolactam) or polyamide 6, poly(hexamethylenesebacic amide) or polyamide 610, and poly(11-aminoundecanoic acid) or polyamide 11, preferably cellulose triacetate and cellulose 2 ½-acetate and above all polyesters, e.g. those from terephthalic acid and ethylene glycol or 1,4-dimethylol cyclohexane, and copolymers of terephthalic and isophthalic acid with ethylene glycol and, if appropriate, 1,4-dimethylol cyclohexane.

These materials can be in the most widely differing processed forms, for example spun yarns, knitted fabrics, woven fabrics, yarns or fibers.

These materials are dyed with the dyes according to the invention under such conditions that the group of the formula $$F\text{—}O\text{—}CO\text{—}CH_2\text{—}W$$

is split as follows $$F\text{—}OH + HOOC\text{—}CH_2\text{—}W$$

so as to form a water-insoluble disperse dye which exhausts as such onto the material.

This is accomplished by dyeing the material at elevated temperature, for example at 80° to 130° C, if appropriate under pressure, in a slightly acid, neutral or alkaline bath at a pH of c. 3 to 10, preferably 4 to 7. Buffer systems which contain, for example, phosphates or carboxylates, may be added to this dyebath. The novel dyes have a particularly good temporary solubility in aqueous dyebaths.

The process has the advantage of being extraordinarily easy to operate. Both the dyeing and printing procedure can be carried out by the conventional methods and, besides the new dyestuff derivatives, no disproportionately large amounts of assistants and also no special machinery is required.

Compared with conventional disperse dyeing, this process has a number of decisive advantages which have already been mentioned at the outset, viz. that the dyes do not have to be in dispersion and therefore the complicated grinding problems involved in the use of disperse dyes do not arise. Also no mainly poisonous, effluant polluting dispersants are required, so that consequently the troublesome foaming problems which occur in large-scale apparatus do not arise.

The following Examples illustrate the invention, the parts and percentages being by weight unless otherwise stated and the relationship between parts by weight and parts by volume being the same as that between the gram and the milliliter.

EXAMPLE 1

4.5 parts of the dye of the formula

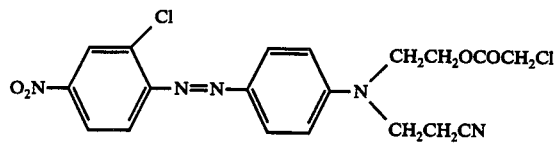

are dissolved in 25 parts by volume of acetone at 50° C and the solution is treated with 1.36 parts of 4-N,N-dimethylpiperazine. After the mixture has been heated for 3 hours to 50° C, the quaternary dye is filtered off, washed with acetone, and dried to yield 4.2 parts of a red powder of the formula

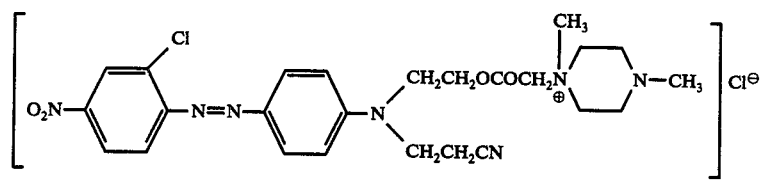

which has very good solubility in cold water.

When this dye is applied to polyester in the exhaustion process over the course of 1 hour at 130° C and in the presence of a phthalate buffer at a pH between 4 and 7, there are obtained level dyeings of a red shade with very good fastness properties. The addition of an assistant to the dyebath is not necessary.

EXAMPLE 2

The chloroacetic ester dye of Example 1 is reacted under the same conditions and in the same molar ratios with the amine of the formula

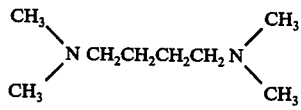

to yield the dye of the formula

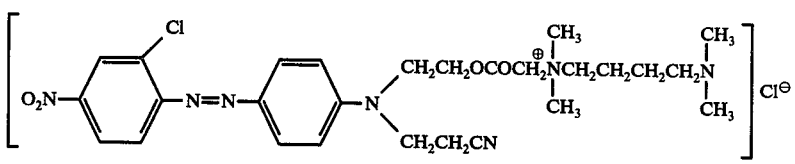

in crystalline form.

A clear solution of this dye in a glacial acetic acid-/acetate buffer which is adjusted to a pH of 4.5 is applied to polyester fabric in a HT circulating machine at a dyestuff:liquor ratio of 1:12. Dyeing is performed for 50 minutes at 130° C and the dye liquor is then drawn off while hot. A faultlessly dyed polyester fabric of good fastness properties is obtained. The use of dyeing assistants, for example dispersants, is unnecessary.

EXAMPLE 3

52.6 parts of the dye of the formula

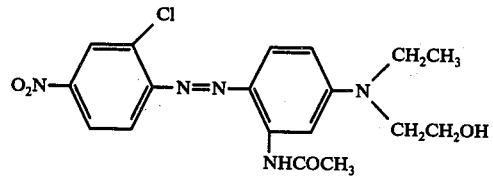

are stirred into 400 parts by volume of methyl ethyl ketone and 20 parts by volume of anhydrous pyridine. At room temperature 20 parts by volume of chloroacetyl chloride are added slowly dropwise and stirring is performed until no more starting product can be detected in thin layer chromatography. Then 35 parts by volume of tetramethylpropylenediamine are added and quaternisation is effected at 60° C. After 8 hours, the dye of the following formula has formed in virtually quantitative yield.

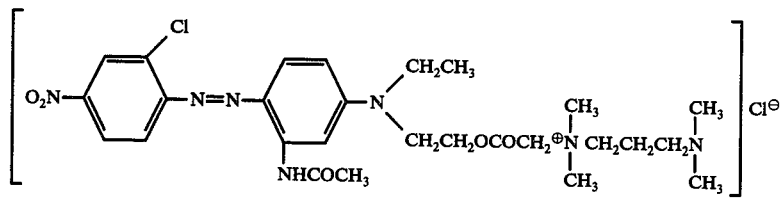

It is filtered off and dried after being washed once with acetone at 60° C. Yield: 100 parts. The ruby coloured dye is of good purity and has very good solubility in cold water. Polyester fabric is dyed with this dye for 60 minutes at 130° C in a HT dyeing machine in the presence of a phthalate buffer with a pH of 5. Level, bluish red dyeings of very good fastness properties are obtained. The addition of any assistants is superfluous.

EXAMPLE 4

58 parts of the disperse dye of the formula

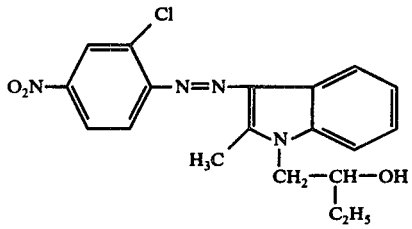

are dissolved in a mixture of 500 parts by volume of methyl ethyl ketone and 13 parts by volume of pyridine. Then 13 parts by volume of chloroacetyl chloride are added slowly dropwise. Stirring is then continued for 1 hour after the exothermic reaction has subsided. Then 40 parts by volume of N,N,N',N-tetramethylethylenediamine are added and the mixture is diluted with 100 parts by volume of methyl ethyl ketone and stirring is continued for 3 hours at 60° C. The batch is then cooled to room temperature and the precipitated dye of the formula

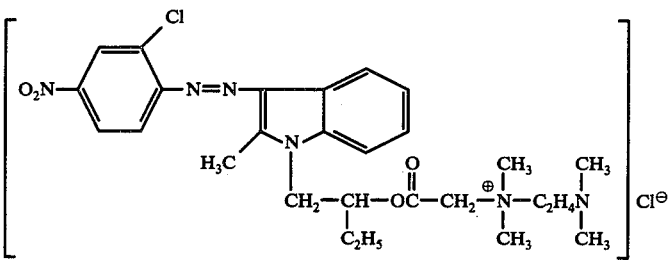

is filtered off, washed with acetone and dried at 60°-70° C in a high vacuum. Tightly packed polyester fabric is dyed with water-soluble dye in a pressure dyeing apparatus at 130° C and a pH of 5. A very level, orange red dyeing of outstanding fastness properties is obtained.

Neither dispersants nor any other assistants need be used.

The dyes listed in the following Tables 1-8, which yield the indicated shades on polyester fabric, are obtained in analogous fashion from the corresponding chloroacetic esters.

EXAMPLE 5

10.95 parts of the dye of Example 2 in Table 3 are suspended in 66 parts of chlorobenzene at 45° to 50° C. This suspension is then reacted for 3 hours at the same temperature with 2.17 parts of dimethyl sulphate, in the process of which the second nitrogen atom in the water-solubilising radical W is also quaternised. Filtration yields 13.1 parts of the dye of the following constitution

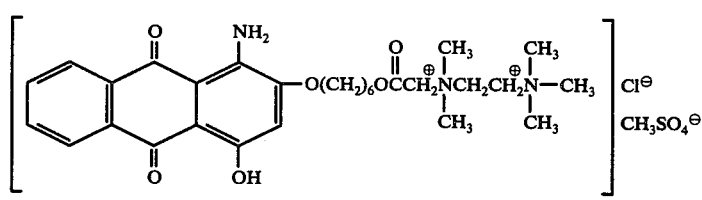

1.5 g of the dye are dissolved in 2 liters of water of 50° C and a pH of 5 is established by addition of 80% acetic acid. Then 100 g of a polyester fabric are put into this dyebath, which is heated within 30 minutes to 130° C in a sealed apparatus. Dyeing is performed for 60 minutes at this temperature. The fabric is subsequently rinsed and subjected to an aftertreatment for 20 minutes at 70° C in a liquor which contains 2 g of hydrosulphite and 3 ml of sodium hydroxide solution (36° Bd) per liter of water and then dried. A level, brilliant, pink dyeing of good fastness properties is obtained. It was not necessary to use any assistants (e.g. dispersants).

Table 1

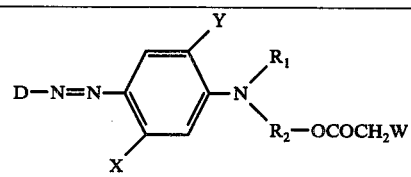

| D | $R_1$ | $R_2$ | Shade |
|---|---|---|---|
| 2-chloro-4-nitrophenyl | —CH$_3$ | —CH$_2$CH$_2$— | yellowish red |
| " | —H$_2$CCH$_2$—OCOCH$_3$ | " | " |
| " | CH$_2$C$_6$H$_5$ | " | " |
| " | —CH$_2$CH$_2$CN | " | scarlet |
| " | —CH$_2$CH$_2$OH | " | yellowish red |
| " | —CH$_2$CH$_3$ | " | bluish red |
| " | —CH$_2$C$_6$H$_5$ | " | " |
| " | —CH$_3$ | " | " |
| 2-bromo-6-cyano-4-nitrophenyl | —CH$_2$CH$_3$ | " | blue |
| " | —CH$_2$CH$_3$OH | " | " |

Table 1-continued

| | | | |
|---|---|---|---|
| " | —CH$_2$C$_6$H$_5$ | " | " |
| " | " | " | navy blue |
| " | —CH$_2$CH$_3$ | " | " |
| " | —CH$_2$CH$_2$CN | " | " |
| 2,4-dinitro-6-cyano-phenyl | —CH$_3$ | " | blue |
| " | —CH$_2$CH$_3$ | " | " |
| " | —CH$_2$C$_6$H$_5$ | " | " |
| " | —CH$_2$CH$_2$CN | " | " |
| " | —CH$_2$CH$_2$Cl | " | " |
| " | —CH$_2$C$_6$H$_5$ | " | navy blue |

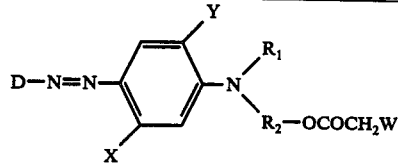

| D | X | Y | W | Shade |
|---|---|---|---|---|
| 2-chloro-4-nitrophenyl | H | H | $(H_3C)_2\overset{\oplus}{N}(CH_2)_2N(CH_3)_2$ | yellowish red |
| " | " | " | " | " |
| " | " | " | " | " |
| " | " | " | " | scarlet |
| " | " | " | " | yellowish red |
| " | —NHCOCH$_3$ | " | " | bluish red |
| " | " | " | " | " |
| 2-bromo-6-cyano-4-nitro-phenyl | " | " | " | blue |
| " | " | " | " | " |
| " | " | " | " | " |
| " | " | OCH$_3$ | " | navy blue |
| " | " | OCH$_2$CH$_3$ | " | " |
| " | " | " | " | " |
| 2,4-dinitro-6-cyano-phenyl | " | H | " | blue |
| " | " | " | " | " |
| " | " | " | " | " |
| " | " | " | " | " |
| " | " | " | " | " |
| " | " | OCH$_3$ | " | navy blue |
| " | " | OCH$_2$CH$_3$ | " | " |

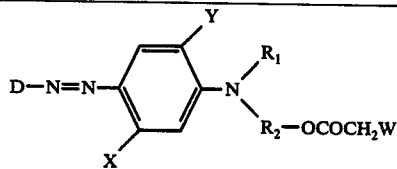

| D | R$_1$ | R$_2$ | Shade |
|---|---|---|---|
| 2,4-dinitro-6-cyanophenyl | —CH$_2$CH$_2$OH | —CH$_2$CH$_2$— | navy blue |
| 2,4-dinitro-6-chlorophenyl | —CH$_2$CH$_3$ | " | reddish blue |
| " | —CH$_2$C$_6$H$_5$ | " | " |
| " | —CH$_2$C$_6$H$_5$ | " | navy blue |
| " | —C$_2$H$_4$CN | " | " |
| " | —C$_2$H$_4$OH | " | " |
| " | —CH$_2$CH$_2$CN | —CH$_2$—CH— <br>   \|<br>   CH$_2$Cl | " |
| 4-nitro-2,6-dicyanophenyl | —CH$_3$ | —CH$_2$CH$_2$— | blue |
| " | —CH$_2$CH$_3$ | " | " |
| " | —CH$_2$C$_6$H$_5$ | " | " |
| " | " | " | " |
| 2,4-dinitro-6-bromophenyl | —CH$_2$CH$_3$ | " | " |
| " | —CH$_2$CH$_2$OH | " | " |
| " | —H | —CH$_2$CH—<br>   \|<br>   CH$_2$Cl | navy blue |
| " | " | " | " |
| " | —CH$_2$CH$_2$OH | —CH$_2$CH$_2$— | " |
| " | —CH$_2$CH$_2$CN | " | " |
| " | —CH$_2$CH$_2$OH | " | " |
| " | —CH$_2$C$_6$H$_5$ | " | " |

Table 1-continued

| " | H | -CH₂CHCH₂O-C₆H₁₁ (with cyclohexyl on O, branch on middle C) | " |

Structure:
D—N=N—(benzene ring with Y top, X bottom, N(R₁)(R₂—OCOCH₂W) at position)

| D | X | Y | W | Shade |
|---|---|---|---|---|
| 2,4-dinitro-6-cyanophenyl | —NHCOCH₃ | OCH₂CH₃ | $(CH_3)_2\overset{\oplus}{N}(CH_2)_2N(CH_3)_2$ | navy blue |
| 2,4-dinitro-6-chlorophenyl | " | H | " | reddish blue |
| " | " | " | " | " |
| " | " | OCH₂CH₃ | " | navy blue |
| " | " | OCH₃ | " | " |
| " | " | OC₂H₅ | " | " |
| " | " | " | " | " |
| 4-nitro-2,6-dicyanophenyl | " | H | " | blue |
| " | " | " | " | " |
| " | NHCOCH₂Cl | " | " | " |
| " | NHCOCH₂CH₃ | " | " | " |
| 2,4-dinitro-6-bromophenyl | " | " | " | " |
| " | " | " | " | " |
| " | NHCOCH₃ | —OCH₃ | " | navy blue |
| " | " | —OC₂H₅ | " | " |
| " | " | —OCH₃ | " | " |
| " | " | OH | " | " |
| " | " | —OCH₃ | " | " |

Structure:
D—N=N—(benzene ring with Y, X, N(R₁)(R₂—OCOCH₂W))

| D | R₁ | R₂ | Shade |
|---|---|---|---|
| 6-nitro-4-methyl-benzothiazine (O₂N-substituted bicyclic with N=S ring) | —CH₂CH₃ | —CH₂CH₂— | blue |
| " | " | " | " |
| " | —CH₂CH₂OH | " | " |
| " | —CH₂C₆H₅ | " | " |
| " | " | " | greenish blue |
| " | —CH₂CH₂OH | " | " |
| 2-cyano-4-nitrophenyl | —CH₂CH₃ | " | bluish red |
| " | —CH₂CH₂CN | " | red |
| " | " | H₂C—CH—CH₂OC₆H₅ (branch) | " |
| " | " | H₂CCHCH₂—OCH₃ | " |
| 2,6-dichloro-4-nitrophenyl | —CH₂CH₃ | —CH₂CH₂— | violet |
| " | —CH₂CH₂CN | " | brown |
| " | —CH₂CH₂CN | " | " |
| " | " | H₂C—CH—CH₂Cl | " |
| " | " | " | " |
| " | " | H₂CCH—C₆H₅ | " |
| 4-nitrophenyl | —CH₂C₆H₅ | CH₂CH₂— | yellowish red |
| " | —CH₂CH₂CN | " | " |
| 2-methylsulphonyl-4-nitro- | —CH₂CH₃ | " | red |

Table 1-continued

| | | | |
|---|---|---|---|
| phenyl 5-methylsulphonyl-2-chloro phenyl | " | " | scarlet |
| " | $CH_2C_6H_5$ | " | " |

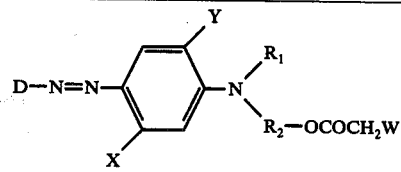

| D | X | Y | W | Shade |
|---|---|---|---|---|
| 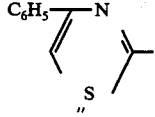 | H | H | $(CH_3)_2\overset{\oplus}{N}(CH_2)_2N(CH_3)_2$ | blue |
| " | $-CH_3$ | " | " | " |
| " | " | " | " | " |
| " | $-Cl$ | " | " | " |
| " | $NHCOCH_3$ | " | " | greenish blue |
| " | " | " | " | " |
| 2-cyano-4-nitrophenyl | H | " | " | bluish red |
| " | " | " | " | red |
| " | " | " | " | " |
| " | $-NHCOCH_3$ | " | " | violet |
| 2,6-dichloro-4-nitrophenyl | H | " | " | brown |
| " | Cl | " | " | " |
| " | H | " | " | " |
| " | " | " | " | " |
| " | $H_3C-$ | " | " | " |
| " | " | " | " | " |
| 4-nitrophenyl | $CHCOCH_3$ | " | " | yellowish red |
| " | " | " | " | " |
| 2-methylsulphonyl-4-nitro-phenyl | H | " | " | red |
| 5-methylsulphonyl-2-chloro phenyl | $NHCOCH_3$ | " | " | scarlet |
| " | " | " | " | " |

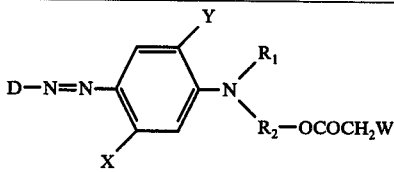

| D | $R_1$ | $R_2$ | Shade |
|---|---|---|---|
|  | $CH_2CH_2CN$ | $-CH_2CH_2-$ | scarlet |
| " | $CH_2C_6H_5$ | " | " |
| 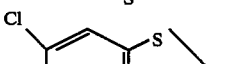 | $CH_2CH_2CN$ | " | " |
| 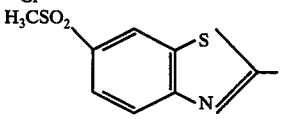 | " | " | " |
|  | " | " | yellowish red |

Table 1-continued

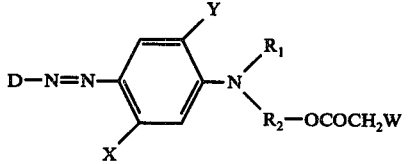

| D | X | W | Shade |
|---|---|---|---|
| C₆H₅–⟨thiazoline with N, S, isopropyl⟩ | H | H | $(H_3C)_2\overset{\oplus}{N}(CH_2)_2N(CH_3)_2$ | scarlet |
| H₃CS–⟨thiazoline with N, S, isopropyl⟩ | " | " | " | " |
| ⟨dichlorobenzothiazole⟩ | " | " | " | " |
| H₃CSO₂–⟨benzothiazole⟩ | " | " | " | yellowish red |

Table 2

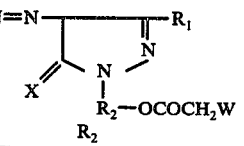

| D | X | R₁ | R₂ | W | Shade |
|---|---|---|---|---|---|
| 2-chloro-4-nitrophenyl | NH | CH₃ | –CH₂CH₂– | $(CH_3)_2\overset{\oplus}{N}(CH_2)_3N(CH_3)_2$ | reddish yellow |
| " | O | " | " | " | yellow |
| " | NH | C₆H₅ | " | " | reddish yellow |
| " | " | CH₃ | –CH₂–CH–C₆H₅ | " | " |
| " | " | " | –CH₂CHCH₂O–⟨phenyl⟩ | " | " |
| 2-nitrophenyl- | " | " | –H₂CCHC₆H₅ | $(H_3C)_2\overset{\oplus}{N}CH_2CH_2N(CH_3)_2$ | golden yellow |
| 2,4-dinitrophenyl- | " | " | –CH₂CH₂– | " | orange |
| 4-methylsulphonyl-4-nitrophenyl- | O | " | " | " | golden yellow |

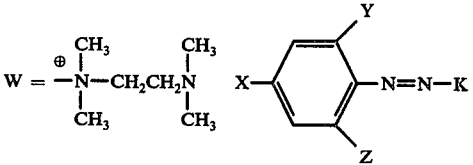

$W = -\overset{\oplus}{\underset{CH_3}{\overset{CH_3}{N}}}-CH_2CH_2N\underset{CH_3}{\overset{CH_3}{\phantom{N}}}$

| X | Y | Z | K | Shade |
|---|---|---|---|---|
| WCH₂COOCH₂CH₂NSO₂–CH(CH₃)₂ | H | H | 1,3,5-phenylmethylpyrazolone | yellow |
| " | " | " | 1 3'chlorophenyl-3-methylpyrazolone-5 | " |
| " | Cl | " | " | " |
| " | H | " | 2 phenylindole | golden yellow |
| WCH₂COOCH₂CH₂N(CH₃)CO– | " | " | 1,3,5-phenylmethylpyrazolone | yellow |
| " | " | " | 1 2'ethylphenyl 3-methyl-5-pyrazolone | " |

Table 2-continued

| X | Y | Z | K | Shade |
|---|---|---|---|---|
| " | " | " | 1 2',5'-chloromethylphenyl 3-methyl-5-pyrazolone | " |
| " | " | " | 2 phenylindole | golden yellow |
| " | " | " | N,N-diethylaniline | orange |
| " | " | " | 1,3,5-phenylmethylpyrazolone | yellow |
| WCH₂COOCH₂CH₂N(cyclohexyl)SO₂— | " | " | 1 4'-methylphenyl 3-methyl-5-pyrazolone | " |
| " | " | " | 2-ethylindole | golden yellow |
| " | Cl | Cl | 2-phenylindole | " |
| WCH₂COOCH₂CH₂N(CH₃)CO— | H | H | 3-cyano-6-hydroxy-4-methyl-2-pyridone | greenish yellow |
| WCH₂COOCH₂CH₂N(CH₃)SO₂— | " | " | " | " |
| " | " | " | 1,3-diamino-4-cyano-6-dimethylaminopyridine | golden yellow |
| " | " | " | 1,3,5-phenymethylpyrazolone | yellow |
| " | " | " | 1 4'-methylphenyl-3-methyl-5-pyrazolone | " |

| X | Y | Z | K | Shade |
|---|---|---|---|---|
| W—CH₂COOCH₂CH₂N(CH₃)SO₂— | H | H | 1 3'-chlorophenyl-3-methyl-5-pyrazolone | yellow |
| " | Cl | " | " | " |
| " | " | Cl | " | " |
| " | CH₃ | H | " | " |
| " | NO₂ | " | " | " |
| " | H | " | 2-methylindole | golden yellow |
| " | " | " | 2-phenylindole | " |
| " | " | " | 2-phenyl-N-methylindole | " |
| " | Cl | " | 2-phenylindole | " |
| " | " | Cl | " | " |
| " | " | " | 2-methylindole | " |
| " | H | H | N-(β-hydroxy)-N-(β-cyanoethyl)aniline | orange |
| " | " | " | dicyanoethylaniline | " |
| " | " | " | N,N-ethylbenzylaniline | " |
| " | " | " | N,N-dibenzylaniline | " |
| " | " | " | N,N-diethyl-m-toluidine | " |
| " | " | " | N,N-diethyl-acetyl-m-phenylenediamine | scarlet |
| " | " | " | 2-naphthylamine | orange |
| WCH₂COOCH₂CH₂O— | NO₂ | H | 2-phenylindole | orange |
| " | " | " | acetoacetanilide | yellow |
| " | " | " | 1(4'chlorophenyl)3-methylpyrazolone | orange |
| " | " | " | 1(3'chlorophenyl)3-methylpyrazolone | yellow |
| " | Br | " | 1(4'-methylphenyl)3-methylpyrazolone | " |
| " | " | " | 1(2,5-chlorophenyl)3-methylpyrazolone | " |

| X | Y | Z | K | Shade |
|---|---|---|---|---|
| H | WCH₂COOCH₂CH₂N(CH₃)SO₂— | H | 1,3,5-phenylmethylpyrazolone | yellow |
| " | " | " | 1 4'-methylphenyl 3-methyl-5-pyrazolone | " |
| Cl | " | " | " | " |
| " | " | " | 1 3'-chlorophenyl 3-methylpyrazolone-5 | " |
| H | " | " | 2 phenylindole | golden yellow |
| Cl | " | " | " | " |
| H | WCH₂COOCH₂CH₂N(CH₃)CO— | " | 1,3,5-phenylmethylpyrazolone | yellow |
| Cl | " | " | " | " |
| H | WCH₂COOCH₂CH₂N(cyclohexyl)CO | " | | |

Table 3

$$W = \left[ -\overset{\oplus}{\underset{CH_3}{\overset{CH_3}{N}}} - CH_2CH_2 - \overset{CH_3}{\underset{CH_3}{N}} \right] Cl^{\ominus}$$

| R₁ | R₂ | R₃ | R₄ | Z | Shade |
|---|---|---|---|---|---|
| NH₂ | OH | H | H | —OCH₂CH₂OCOCH₂W | pink |
| " | " | " | " | —O(CH₂)₆OCOCH₂W | " |
| " | " | " | " | —COOCH₂C(CH₃)₂CH₂OCOCH₂W | violet |
| " | NH₂ | " | " | " | blue |
| " | " | " | " | —OCH₂CH₂OCOCH₂W | violet |

Table 3-continued $$W = \left[ -\overset{\oplus}{\underset{CH_3}{\overset{CH_3}{N}}}-CH_2CH_2-\underset{CH_3}{\overset{CH_3}{N}} \right] Cl^{\ominus}$$

| $R_1$ | $R_2$ | $R_3$ | $R_4$ | Z | Shade |
|---|---|---|---|---|---|
| OH | OH | " | " | $SCH_2CH_2CON(CH_2CH_2OCOCH_2W)_2$ | scarlet |
| $NH_2$ | H | " | " | $-COOCH_2\underset{CH_3}{\overset{CH_3}{C}}CH_2OCOCH_2W$ | scarlet |
| " | OH | $NH_2$ | OH | $-SCH_2CH_2OCOCH_2W$ | blue |
| " | $NO_2$ | H | H | $-COOCH_2\underset{CH_3}{\overset{CH_3}{C}}CH_2OCOCH_2W$ | orange |
| " | " | $NH_2$ | OH | ⌬$-OCH_2CH_2OCOCH_2W$ | blue |
| " | $NHCH_2CH_2OCOCH_2W$ | H | H | $-COOCH_2\underset{CH_3}{\overset{CH_3}{C}}HCH_3$ | " |
| " | " | " | " | $-CN$ | " |
| " | " | " | " | $-SO_2N(C_2H_5)_2$ | " |
| " | $NH$-⌬-$OCH_2CH_2OCOCH_2W$ | " | " | $-COOCH_2\underset{CH_3}{\overset{CH_3}{C}}HCH_3$ | " |
| OH | OH | " | " | $-SCH_2CH_2OCOCH_2W$ | orange |
| $NH_2$ | " | " | " | $O$-⌬-$CH_2CH_2OCOCH_2W$ | red |
| " | " | " | " | $-OCH_2CH_2\underset{OCOCH_2W}{\overset{}{C}}H-CH_3$ | " |
| OH | $NH$-⌬-$NHCOCH_2CH_2OCOCH_2W$ | " | " | H | reddish blue |
| " | $NH$-⌬-$SO_2N-C_2H_5$ with $CH_2CH_2OCOCH_2W$ | " | " | " | violet |
| $-NHCH_3$ | $-NHCH_2CH_2OCOCH_2W$ | " | " | " | blue |
| $-NHCH_2CHCH_3$ with $OCOCH_2W$ | $NH_2$ | $NO_2$ | OH | " | " |
| $-OH$ | $-NH$-⌬-$CH_2CH_2OCOCH_2W$ | " | " | " | " |
| $-NHCH_2CH_2OCOCH_2W$ | $-NHCH_2CH_2OH$ | $-OH$ | $-OH$ | " | greenish blue |
| OH | OH | H | H | $-SCH_2\underset{C_6H_5}{\overset{}{C}}H-OCOCH_2W$ | orange |

Table 3-continued

Structure: Anthraquinone core with R4, R1 at 1,8 positions, R3, R2 at 4,5 positions, Z substituent, and two C=O groups.

$$W = -\overset{\oplus}{\underset{CH_3}{\underset{|}{N}}}(CH_3)_2-CH_2CH_2-\underset{CH_3}{\overset{CH_3}{N}} \quad Cl^{\ominus}$$

| R₁ | R₂ | R₃ | R₄ | Z | Shade |
|---|---|---|---|---|---|
| " | NH—C₆H₄—CH₂OCOW (meta) | —NO₂ | —OH | H | blue |
| NH₂ | NH—C₆H₅ | H | H | —OCH₂CH₂OCOCH₂W | violet |
| " | " | " | " | COOCH₂C(C₂H₅)(C₄H₉)CH₂OCOCH₂ | greenish blue |
| NH—C₆H₄—CH₃ (para), —CH₂COOCH₂CH₃ | NHCH₂CH₂OCOCH₂W | " | " | H | " |

Table 4

Structure: 2-Cl-4-NO₂-phenyl—N=N—C₆H₄—N(CH₂CH₂CN)(CH₂CH₂OCOCH₂W)

$$W = \overset{CH_3}{\underset{CH_3}{\overset{|}{\underset{\oplus}{N}}}} CH_2CH_2N\overset{CH_3}{\underset{CH_3}{\overset{|}{}}}$$

$$W = \overset{CH_3}{\underset{CH_3}{\overset{|}{\underset{\oplus}{N}}}}(CH_2)_3-N\overset{CH_3}{\underset{CH_3}{\overset{|}{}}}$$

$$W = \overset{CH_3}{\underset{CH_3}{\overset{|}{\underset{\oplus}{N}}}}(CH_2)_4-N\overset{CH_3}{\underset{CH_3}{\overset{|}{}}}$$

$$W = \overset{CH_3}{\underset{CH_3}{\overset{|}{\underset{\oplus}{N}}}}(CH_2)_5-N\overset{CH_3}{\underset{CH_3}{\overset{|}{}}}$$

$$W = \overset{CH_3}{\underset{CH_3}{\overset{|}{\underset{\oplus}{N}}}}(CH_2)_6-N\overset{CH_3}{\underset{CH_3}{\overset{|}{}}}$$

Table 4-continued

Structure: 2-Cl-4-NO₂-phenyl—N=N—C₆H₄—N(CH₂CH₂CN)(CH₂CH₂OCOCH₂W)

$$W = -\overset{\oplus}{\underset{CH_2CH_2}{N}}\begin{pmatrix}CH_3 \\ CH_2CH_2\end{pmatrix}N\begin{pmatrix}CH_3\end{pmatrix}$$

$$W = -\overset{\oplus}{N}\begin{pmatrix}CH_2CH_2 \\ CH_2CH_2 \\ CH_2CH_2\end{pmatrix}N$$

$$W = (CH_3)_2\overset{\oplus}{\underset{CH_3}{N}}CH(CH_2)_2N(CH_3)_2$$

$$W = (CH_3)_2-\overset{\oplus}{N}-CH_2N(CH_3)_2$$

The dyes in Table 4 dye polyester in red shades

Table 5

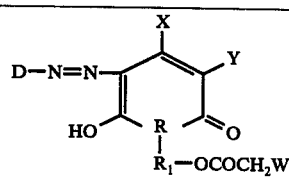

| D | X | Y | R₁ | W | Shade |
|---|---|---|---|---|---|
| 4-Chlorphenyl | CH₃ | CN | CH₂CH₂ | $-\overset{\oplus}{N}(CH_3)_2CH_2CH_2N(CH_3)_2$ | greenish yellow |

Table 5-continued $$\begin{array}{c} \text{structure: D-N=N- attached to ring with X, Y, HO, R, R}_1\text{-OCOCH}_2\text{W, =O} \end{array}$$

| D | X | Y | R₁ | W | Shade |
|---|---|---|---|---|---|
| " | " | COOCH₃ | " | (CH₃)₂N⁺(CH₂)₃N(CH₃)₂ | " |
| " | " | CON(CH₃)₂ | " | " | " |
| 2-Chlorphenyl | —CH₃ | CN | " | (H₃C)₂N⁺CH₂CH₂N(CH₃)₂ | " |
| " | C₂H₅ | " | " | " | " |
| 4-Phenylazophenyl | CH₃ | CN | " | " | orange |
| [cyclohexyl with CH₃ and SO₂N(CH₃)₂] | " | " | " | " | greenish yellow |
| 4-Chlorphenyl | " | " | H₂C—CH— / CH₂OC₆H₅ | " | " |
| " | " | " | —H₂C—CH— / C₆H₅ | " | " |
| " | " | " | CH₂CH₂ | [piperazinium: N⁺(CH₃)(CH₂CH₂)₂N—CH₂—CH₃] | " |
| 3-Nitrophenyl | " | " | " | " | " |
| 4-    " | " | " | " | (H₃C)₂N⁺CH₂CH₂N(CH₃)₂ | " |
| 4-Chloro-2-nitrophenyl | " | " | " | " | yellow |
| 2,4-dichlorophenyl | " | " | —CH₂—CH₂— | " | greenish yellow |
| " | " | " | CH₂—CH₂—CH₂ | " | " |
| " | " | " | CH₂—CH—CH₃ | " | " |
| 2,4,5-trichlorophenyl | " | " | —CH₂—CH₂—CH₂— | " | " |
| " | " | " | —CH₂—CH₂— | " | " |
| 2,3,4,5,6-pentachlorophenyl | " | " | —CH₂—CH₂—CH₂— | " | " |
| " | " | " | —CH₂—CH—CH₃ | " | " |
| 4-methyl-2-nitrophenyl | " | " | —CH₂—CH₂—CH₂— | " | " |
| 4-methoxy-2-nitrophenyl | " | " | " | " | " |
| 4-nitro-2-chlorophenyl | " | " | " | " | " |
| 4-nitro-2-cyanophenyl | " | " | " | " | " |
| 4-carboxylic acid benzyl-ester-phenyl | " | " | —CH₂—CH₂— | " | " |
| " | " | " | —CH₂—CH—CH₃ | " | " |
| 4-carboxylic acid-n-butyl-ester-phenyl | " | " | —CH₂—CH₂—CH₂— | " | " |
| " | " | " | —CH₂—CH₂— | " | " |
| 4-carboxylic acid-hexyl ester-phenyl | " | " | " | " | " |
| 4-carboxylic acid-hexyl ester-phenyl | " | " | —CH₂—CH₂—CH₂— | " | " |
| " | " | " | —CH₂—CH—CH₃ | " | " |
| 4-carboxylic acid-tert.butyl ester-phenyl | " | " | " | " | " |
| 4-carboxylic acid-sec.butyl ester-phenyl | " | " | —CH₂—CH₂— | " | " |
| 4-carboxylic acid-isobutyl ester-phenyl | " | " | —CH₂—CH₂—CH₂— | " | " |
| 4-carboxylic acid-isopropyl ester-phenyl | " | " | " | " | " |
| 2-chloro-5-carboxylic acid isopropyl ester-phenyl | " | " | —CH₂—CH₂—CH₂— | " | " |
| 2-chloro-5-carboxylic acid n-butyl ester-phenyl | " | " | —CH₂—CH₂— | " | " |
| 2-chloro-5-carboxylic acid isobutyl ester-phenyl | " | " | " | " | " |
| 2-nitro-4-benzoyl-phenyl | " | " | " | " | " |
| " | " | " | —CH₂—CH₂—CH₂— | " | " |
| " | " | " | —CH₂—CH—CH₃ | " | " |

Table 5-continued

Structure:
$$D-N=N-C(X)=C(Y)-C(=O)-C(R)(R_1-OCOCH_2W)-C(OH)=$$ (cyclohexenone-type ring with HO and =O)

| D | X | Y | R₁ | W | Shade |
|---|---|---|---|---|---|
| 2-chloro-5-benzoyl-phenyl | " | " | | " | " |
| " | " | " | —CH₂—CH₂—CH₂— | " | " |
| " | " | " | —CH₂—CH₂— | " | " |

Table 6

Structure: acridone with C=O, S—R₁—OCOCH₂W substituent, NO₂ group, N—H

| R₁ | W | Shade |
|---|---|---|
| —CH₂CH₂— | $\overset{\oplus}{-}N(CH_3)_2CH_2CH_2N(CH_3)_2$ | yellow |
| " | $\overset{\oplus}{-}N(CH_3)_2(CH_2)_3O(CH_2)_3N(CH_3)_2$ | " |
| " | $\overset{\oplus}{-}N(CH_3)_2(CH_2)_4$—NH(piperidyl) | " |
| —CH₂—CH(C₆H₅)— | $\overset{\oplus}{-}N(CH_3)_2CH_2N(CH_3)_2$ | " |

Table 6-continued

| R₁ | W | Shade |
|---|---|---|
| —CH₂—CH(CH₂Cl)— | " | " |
| —CH₂—CH(CH₂OC₆H₅)— | " | " |

Table 7

Structure: indole with D—N=N— at 3-position, Z at 2-position, N—R₁—OCOCH₂W

| D | Z | R₁ | W | Shade |
|---|---|---|---|---|
| 2-chloro-4-nitrophenyl | —CH₃ | H₂C—CH(C₂H₅)— | $\overset{\oplus}{-}N(CH_3)_2(CH_2)_3N(CH_3)_2$ | orange |
| " | " | CH₂—CH₂ | $\overset{\oplus}{-}N(CH_3)_2CH_2CH_2N(CH_3)_2$ | " |
| " | " | CH₂CH(CH₃)— | " | " |
| " | C₆H₅ | —H₂CCH(C₂H₅)— | " | reddish orange |
| 2,6-dichloro-4-nitrophenyl | CH₃ | " | " | " |
| C₆H₅—C(=N)—N=C—S (thiadiazolyl) | " | " | " | yellow |

Table 8

Structure: pyrimidine with P—N=N—, NHR₁, NHR₂, NHR₃ substituents $W = -\overset{\oplus}{N}(CH_3)_2CH_2CH_2N(CH_3)_2$

| D | R₁ | R₂ | R₃ | Shade |
|---|---|---|---|---|
| 2-chloro-4-nitrophenyl | C₆H₅ | —C₂H₅ | CH₂CH₂OCOCH₂W | scarlet |
| " | " | —CH(CH₃)₂ | " | " |
| " | C₂H₄OH | C₆H₅ | " | " |
| " | CH₂CH₂OCOCH₂W | " | C₆H₅ | " |
| 2,4-dinitro-6-chloro- | —C₆H₅ | —C₂H₅ | CH₂CH₂OCOCH₂W | red |

Table 8-continued

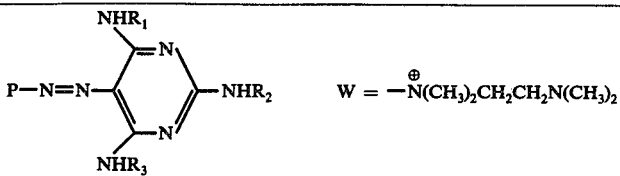

| D | $R_1$ | $R_2$ | $R_3$ | Shade |
|---|---|---|---|---|
| phenyl | —CH$_2$C$_6$H$_5$ | " | " | " |
| " | —C$_6$H$_5$ | —C$_2$H$_5$ | " | " |
| 4-nitrophenyl | " | " | " | orange |
| pentachlorophenyl | " | " | " | yellow |

Table 9

| Dye | Shade on polyester |
|---|---|
| (structure) | golden yellow |
| (structure) | orange |

Table 10

| Dye | Shade on polyester |
|---|---|
| (structure) | yellow |
| (structure) | yellow |

Table 10-continued

| Dye | Shade on polyester |
|---|---|
| (structure) | yellow |

We claim:

1. A transiently water-soluble disperse dye of the formula

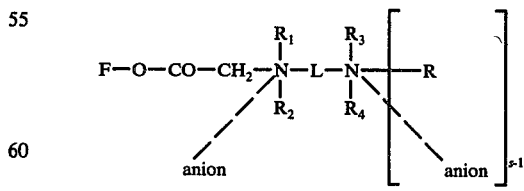

wherein
  $s$ is 1 or 2,
  $R_1$ is alkyl of up to 15 carbon atoms or benzyl,
  $R_2$ is alkyl of up to 15 carbon atoms or benzyl,
  $R_3$ is hydrogen, alkyl of up to 15 carbon atoms or benzyl; or together with $R_1$ or $R_4$ is lower alkylene, R₄ is hydrogen, alkyl of up to 15 carbon atoms or benzyl; or together with R₂ is lower alkylene, R is hydrogen, alkyl of up to 15 carbon atoms or benzyl, L is alkylene of up to 18 carbon atoms which is uninterrupted or interrupted by —O—, —S— or —NH—; or is a direct bond, and F is the radical of a non-heterocyclic, monoazo disperse dye;

wherein the —O—CO— group is bonded to an aromatic nuclear carbon atom of F through a group of the formula -alkylene—X— wherein
X is directly bonded to said nuclear carbon atom of F and X is selected from the group consisting of
a direct bond,
—O—
—SO₂—,
—SO₂—NH—,
—SO₂—N(alkyl)-,
—CO—NH—, and
—CO—N(alkyl)-;
or through a group of the formula

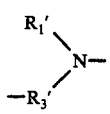

wherein the nitrogen is directly bonded to said nuclear carbon atom of F;

R₁' is lower alkyl which is unsubstituted or substituted by fluoro, chloro, bromo, lower alkoxy, lower alkylcarbonyloxy, lower alkylcarbonylamino, benzoyloxy, benzoylamino, cyano, hydroxy, lower alkylsulfonyloxy, phenylsulfonyloxy, cyanoethoxy, phenyl, lower alkylsulfonyl, lower alkoxycarbonyloxy, lower alkylaminocarbonyloxy, phenoxycarbonyloxy, or phenylaminocarbonyloxy; and R₃' is lower alkylene.

2. A transiently water-soluble disperse dye according to claim 1, wherein F is of the formula

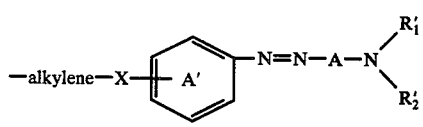

wherein
R₁' and R₂' are independently hydrogen, lower alkyl or lower alkyl substituted by fluorine, chlorine, bromine, lower alkoxy, lower alkylcarbonyloxy, lower alkylcarbonylamino, benzoyloxy, benzoylamino, cyano, hydroxy, lower alkylsulfonyloxy, phenylsulfonyloxy, cyanoethoxy, phenyl, lower alkylsulfonyl, lower alkoxycarbonyloxy, lower alkylaminocarbonyloxy, phenoxycarbonyloxy or phenylaminocarbonyloxy;

the benzene ring A' is unsubstituted or substituted by chloro, bromo, nitro, cyano, thiocyano, trifluoromethyl, lower alkyl, lower alkoxy, phenoxy, lower alkylmercapto, carboxamido, sulfonamido, acyl or acylamino, where "acyl" represents benzoyl, benzenesulfonyl, benzylsulfonyl, lower alkylsulfonyl, lower alkoxycarbonyl or lower alkanoyl; and A is 1,4-phenylene which is unsubstituted or substituted by chloro, lower alkyl, lower alkoxy, phenylmercapto, phenoxy, lower alkoxycarbonyl, bromo, trifluoromethyl, acylamino or N-methyl acylamino, where "acyl" is methyl-, ethyl-, or p-tolylsulfonyl; lower alkanoyl, lower alkylcarbamyl, lower alkoxycarbonyl, phenylcarbamyl, phenoxycarbonyl, benzoyl, phenoxyacetyl, chloroacetyl or phenylacetyl.

3. A transiently water-soluble disperse dye according to claim 2, wherein F is of the formula

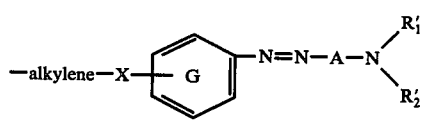

wherein the ring G is unsubstituted or substituted by lower alkyl, lower alkoxy, lower alkoxycarbonyl, chloro, bromo, lower alkylsulfonyl, nitro or cyano.

4. A transiently water-soluble disperse dye according to claim 2, wherein F is of the formula

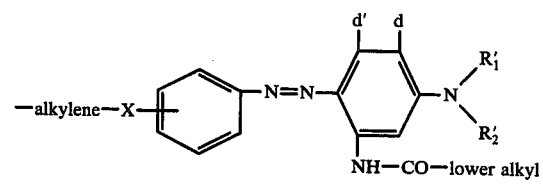

wherein
R₁' and R₂' are independently lower alkyl, phenylethyl, benzyl, cyanoethyl, lower alkylcarbonyloxylower alkyl, hydroxylower alkyl or cyanoethoxyethyl;

d is hydrogen, chloro, bromo, lower alkyl, lower alkoxy, lower alkylthio, phenoxy, phenylthio or lower alkoxycarbonyl; and d' is hydrogen, or if d is hydrogen, d' is hydrogen or acylamino.

5. A transiently water-soluble disperse dye according to claim 4, wherein F is of the formula

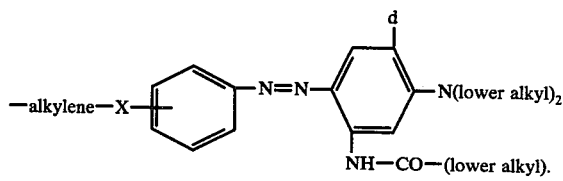

6. A transiently water-soluble disperse dye according to claim 1 wherein F is of the formula

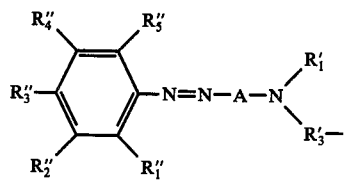

wherein
R₁'' is hydrogen, bromo, thiocyano, lower alkoxysulfonyl, hydroxy, lower alkylmercapto, acylamino, chloro, nitro, cyano, acyl, sulfonamido, carboxyamido, alkoxy or phenoxy;

$R_2''$ is bromo, carboxyamido, lower alkoxycarbonyl or hydrogen;

$R_3''$ is hydrogen, bromo, chloro, thiocyano, acylamino, phenoxy, nitro, cyano, sulphonamido, carboxyamido or trifluoromethyl;

$R_4''$ is bromo, nitro, cyano, thiocyano, acyl, carboxyamido, lower alkoxy, phenoxy, acylamino, chloro, sulfonamido, trifluoromethyl, lower alkyl or hydrogen;

$R_5''$ is hydrogen, chloro, bromo, nitro, cyano, thiocyano, acyl, trifluoromethyl or lower alkyl;

where "acyl" represents benzoyl, benzenesulfonyl, benzylsulfonyl, lower alkylsulfonyl, lower alkoxycarbonyl or lower alkanoyl; and A is 1,4-phenylene which is unsubstituted or substituted by chloro, lower alkyl, lower alkoxy, phenylmercapto, phenoxy, lower alkoxycarbonyl, bromo, trifluoromethyl, acylamino or N-methylacylamino, where "acyl" is methyl-, ethyl-, or p-tolylsulfonyl; lower alkanoyl, lower alkylcarbamyl, lower alkoxycarbonyl, phenylcarbamyl, phenoxycarbonyl, benzoyl, phenoxyacetyl, chloroacetyl or phenylacetyl.

7. A transiently water-soluble disperse dye according to claim 6, wherein F is of the formula

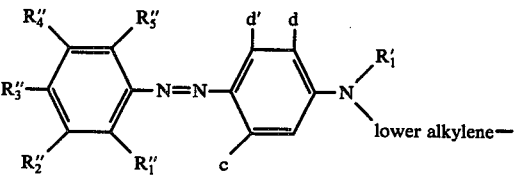

wherein $c$ is hydrogen, chloro, bromo, methyl or lower alkanoylamino;

$d$ is hydrogen, chloro, bromo, lower alkyl, lower alkoxy, lower alkylthio, phenoxy, phenylthio or lower alkoxycarbonyl;

$d'$ is hydrogen, or if $d$ is hydrogen, $d'$ is hydrogen or acylamino; and $R_1'$ is lower alkyl, phenethyl, benzyl, cyanoethyl, cyanoethoxyethyl, hydroxylower alkyl or lower alkylcarbonyloxylower alkyl.

8. A transiently water-soluble disperse dye according to claim 7, wherein $c$ is hydrogen or methyl, and $R_1'$ is lower alkyl.

9. A transiently water-soluble disperse dye according to claim 7, wherein $R_1'$ is lower alkyl and $c$ is lower alkanoylamino.

* * * * *